United States Patent [19]
Henshaw et al.

[11] Patent Number: 5,783,083
[45] Date of Patent: *Jul. 21, 1998

[54] VERTICAL CYLINDRICAL SKEIN OF HOLLOW FIBER MEMBRANES AND METHOD OF MAINTAINING CLEAN FIBER SURFACES

[75] Inventors: Wayne Jerald Henshaw, Burlington; Mailvaganam Mahendran, Hamilton; Henry Behmann, Puslinch, all of Canada

[73] Assignee: Zenon Environmental Inc., Ontario, Canada

[*] Notice: The term of this patent shall not extend beyond the expiration date of Pat. No. 5,639,393.

[21] Appl. No.: 690,045

[22] Filed: Jul. 31, 1996

Related U.S. Application Data

[63] Continuation-in-part of Ser. No. 514,119, Aug. 11, 1995, Pat. No. 5,639,373.
[51] Int. Cl.$^6$ .................................................. B01D 61/00
[52] U.S. Cl. .................... 210/636; 210/500.23; 210/650; 210/321.69; 210/356; 210/321.8; 210/321.89; 210/257.2
[58] Field of Search .................... 210/636, 321.69, 210/321.8, 321.89, 257.2, 650, 500.23, 641, 356

[56] References Cited

U.S. PATENT DOCUMENTS

| | | | |
|---|---|---|---|
| 5,248,424 | 9/1993 | Cote et al. | 210/636 |
| 5,403,479 | 4/1995 | Smidt et al. | 210/636 |
| 5,480,553 | 1/1996 | Yamamori et al. | 210/650 |
| 5,607,593 | 3/1997 | Cote et al. | 210/650 |
| 5,639,373 | 6/1997 | Mahendran et al. | 210/636 |

*Primary Examiner*—Ana Fortuna
*Attorney, Agent, or Firm*—Alfred D. Lobo

[57] ABSTRACT

A gas-scrubbed vertical cylindrical skein of "fibers" has their opposed terminal portions held in headers unconfined in a modular shell, and aerated with a cleansing gas supplied by a gas-distribution means which produces a mass of bubbles serving the function of a scrub-brush for the outer surfaces of the fibers. The skein is surprisingly effective with relatively little cleansing gas, the specific flux through the membranes reaching an essentially constant relatively high value because the vertical deployment of fibers allows bubbles to rise upwards along the outer surfaces of the fibers. The effectiveness is critically dependent upon the length of each fiber in the skein. That length is in the range from at least 0.1% more than the fixed distance between opposed faces of the skein's headers, but less than 5% greater than the fixed distance. Lack of tension allows the fibers to sway in bubbles flowing along their outer surfaces making them surprisingly resistant to being fouled by build-up of deposits of inanimate particles or microorganisms in the substrate. For use in a large reservoir, a bank of skeins is used with a gas distributor means which has fibers preferably >0.5 meter long, which together provide a surface area >10 m$^2$. The terminal end portions of fibers in each header are kept free from fiber-to-fiber contact with a novel method of forming a header.

14 Claims, 13 Drawing Sheets

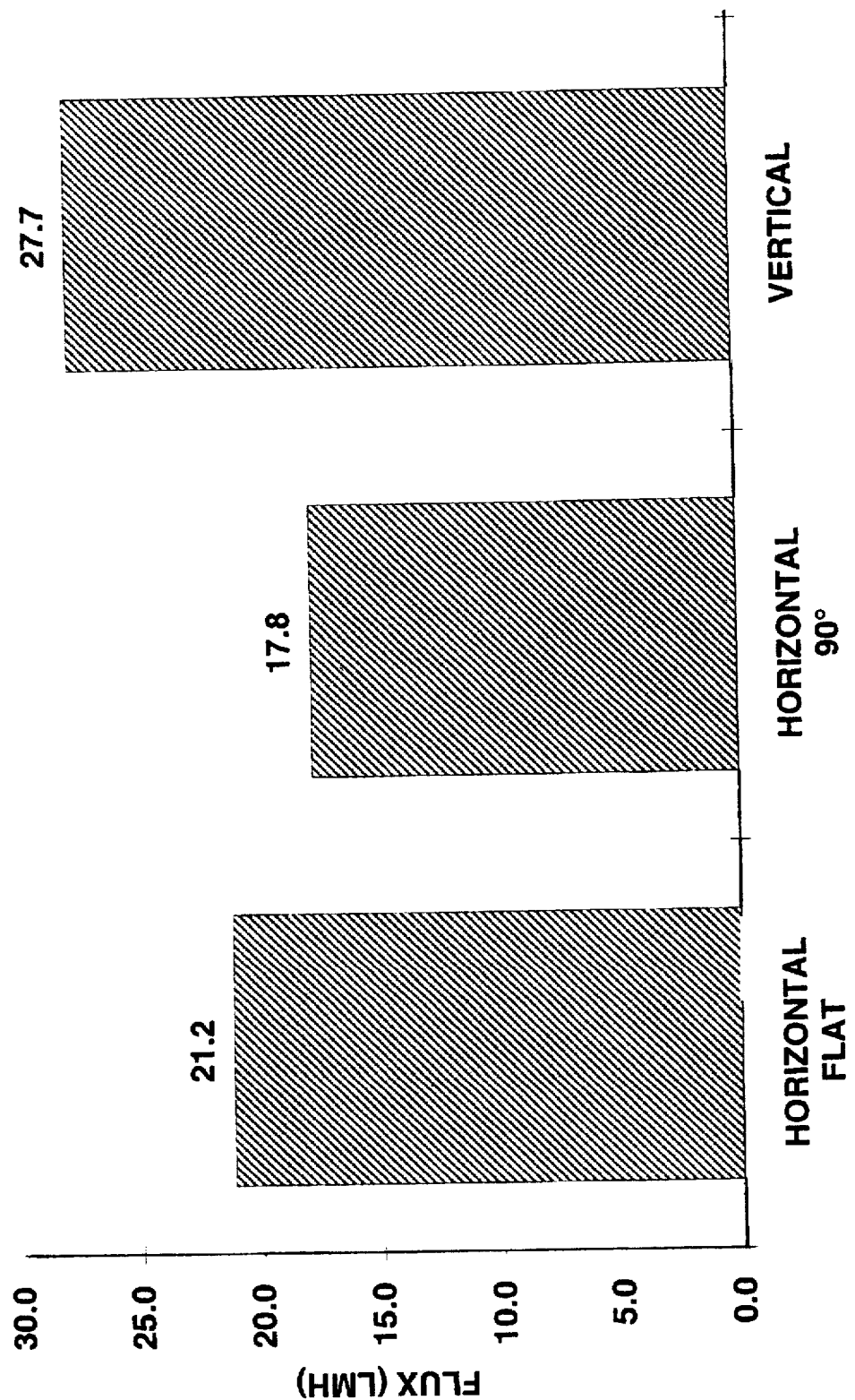

VERTICAL CYLINDRICAL SKEIN OF HOLLOW FIBER MEMBRANES AND METHOD OF MAINTAINING CLEAN FIBER SURFACES

BACKGROUND OF THE INVENTION

This is a continuation-in-part application of Ser. No. 08/514,119 filed Aug. 11, 1995 U.S. Pat. No. 5,639,373. Terms used in the parent case are summarized in a glossary herein to shorten the specification; and, to avoid repetition herein, additional details in the parent case as well as in provisional application Ser. No. 60/012,921 filed Mar. 6, 1996, are incorporated herein by reference thereto as if fully set forth herein. In particular, considerations relative to the prior art and details of operation of prior art devices, all of which have been set forth in the '119 parent and provisional applications, are incorporated herein by reference thereto as if fully set forth herein.

This invention relates to a membrane device which is an improvement on a frameless array of hollow fiber membranes and a method of maintaining clean fiber surfaces while filtering a substrate to withdraw a permeate, which is also the subject of U.S. Pat. No. 5,248,424; and, to a method of forming a header for a skein of fibers.

This invention is particularly directed to relatively large systems for the microfiltration of liquids, and capitalizes on the simplicity and effectiveness of a configuration which dispenses with forming a module in which the fibers are confined. As in the '424 patent, the novel configuration efficiently uses air discharged near the base of a skein to produce bubbles in a specified size range, and in an amount large enough to scrub the fibers, and to provide controlled scrubbing of fibers one against another ("inter-fiber scrubbing"). Unlike in the '424 system the fibers in a skein are vertical and do not present an arcuate configuration above a horizontal plane through the horizontal center-line of a header. As a result, the path of the rising bubbles is generally parallel to the fibers and is not crossed by the fibers of a vertical skein. Yet the bubbles scrub the fibers.

The restrictedly swayable fibers, because of their defined length, do not get entangled, and do not abrade each other excessively, as is likely in the '424 array.

The side-to-side displacement of an intermediate portion of each fiber within the "zone of confinement" or "bubble zone" is restricted by the fiber's length. The defined length of the fibers herein minimizes (i) shearing forces where the upper fibers are held in the upper header, (ii) excessive rotation of the upper portion of the fibers, as well as (ii) excessive abrasion between fibers. Such swaying motion of a fiber with side-to-side displacement is distinct from vibration which occurs when a fiber is taut, that is, when the length of the potted fiber exposed to substrate is not longer than the distance between the opposed faces of upper and lower headers holding the fiber. Such vibration is induced by bubbles in a process for exfoliating and precipitating dense particles in U.S. Pat. No. 5,209,852 to Sunaoka et al. Unlike the fibers held in the module used in the '852 process, in our novel skein, there is essentially no tension on each fiber because the opposed faces of the headers are spaced apart at a distance less than the length of an individual fiber.

The use of an array of fibers in the direct treatment of activated sludge in a bioreactor, is described in an article titled "Direct Solid-Liquid Separation Using Hollow Fiber Membrane in an Activated Sludge Aeration Tank" by Kazuo Yamamoto et al in *Wat. Sci. Tech.* Vol. 21, Brighton pp 43–54, 1989, and discussed in the '424 patent, the disclosure of which is incorporated by reference thereto as if fully set forth herein. The relatively poor performance obtained by Yamamoto et al was mainly due to the fact that they did not realize the critical importance of maintaining flux by aerating a skein of fibers from within and beneath the skein. They did not realize the necessity of thoroughly scrubbing substantially the entire surfaces of the fibers by flowing bubbles through the skein to keep the fibers awash in bubbles. This requirement becomes more pronounced as the number of fibers in the skein increases.

Tests using the device of Yamamoto et al indicate that when the air is provided outside the skein the flux decreases much faster over a period of as little as 50 hr, confirming the results obtained by them. This is evident in FIG. 1 described in greater detail below, in which the graphs show results obtained by Yamamoto et al, and the '424 array, as well as those with a vertical skein in which the headers are rectangular, all three assemblies using essentially identical fibers, under essentially identical conditions.

The investigation of Yamamoto et al with downwardly suspended fibers was continued and recent developments were reported in an article titled "Organic Stabilization and Nitrogen Removal in Membrane Separation Bioreactor for Domestic Wastewater Treatment" by C. Chiemchaisri et al delivered in a talk to the Conference on Membrane Technology in Wastewater Management, in Cape Town, South Africa, Mar. 2–5, 1992, also discussed in the '424 patent. The fibers were suspended downwardly and highly turbulent flow of water in alternate directions, was essential.

It is evident that the disclosure in either the Yamamoto et al or the Chiemchaisri et al reference indicated that the flow of air across the surfaces of the suspended fibers did little or nothing to inhibit the attachment of microorganisms from the substrate.

Later, in European patent application 0 598 909 A1 filed by Yamamori et al, they sought to avoid the problem of build-up on the fibers by "spreading the hollow fibers in the form of a flat sheet" (see page 4, lines 46–7) and there is no indication how the fibers would be maintained in a spread position in actual use. Further, each array is held in a "structural member for enclosing and supporting the fastening member" (see page 3, line 42, and lines 51–52) which is contrary to the concept of a frameless array. Their FIGS. 14, and 18 emphasize the horizontal configuration in which the array is used. To combat build-up FIG. 13 depicts how the fibers would trough when the array is taken out of the reservoir to be "vibrated" or shaken. A prior art module is illustrated in FIG. 16 showing both ends of each fiber potted in a cylindrical header, each fiber forming a loop, the looped ends being free. As the data in FIG. 17 shows, use of the prior art cylindrical module with looped ends freely movable in the substrate, was less effective than the frameless array with spread apart looped fibers shown in FIG. 1.

SUMMARY OF THE INVENTION

It has been discovered that for no known reason, fibers which are more than 5% but less than 10% longer than the fixed distance between the opposed faces of the headers of a vertical skein, tend to shear off at the face; and those 10% longer tend to clump up in the bubble zone; and, that a gas-scrubbed vertical cylindrical skein of substantially concentrically disposed, restrictedly swayable fibers, provides an optimum configuration of fibers through which bubbles of a fiber-cleansing gas ("scrubbing gas") when flowed vertically upwards, parallel to and along the surfaces of the fibers. In a skein of densely packed fibers, bubbles in such a configuration are more effective cleansing agents than bubbles which are intercepted by arcuate fibers crossing the path of the rising bubbles. Bubbles of an oxygen-containing gas to promote growth of microbes unexpectedly fails to build-up growth of microbes on the surfaces of swaying fibers because the surfaces are "vertically air-scrubbed". Deposits of animate and/or inanimate particles upon the surfaces of fibers are minimized when the restrictedly swayable fibers are kept awash in codirectionally rising bubbles which rise with sufficient velocity to exert a physical scrubbing force (momentum provides the energy) to keep the fibers substantially free of deleterious deposits. Thus, an unexpectedly high flux is maintained in fibers over each unit area the surface of the skein fibers over a long period.

In a "gas-scrubbed assembly" comprising a skein and a gas-distribution means, the skein preferably has a surface area which is at least >1 m², and opposed spaced-apart ends of the fibers are secured in spaced-apart headers, so that the fibers, when deployed in the substrate, acquire a generally vertical cylindrical profile within the substrate and sway independently within the bubble zone defined by at least one column of bubbles. The length of fibers between opposed surfaces of headers from which they extend, is in a critical range from at least 0.1% (percent) longer than the distance separating those opposed faces, but less than 5% longer. Usually the length of fibers is less than 2% longer, and most typically, less than 1% longer, so that sway of the fibers is confined within a vertical zone of movement, the periphery of which zone is defined by side-to-side movement of outer skein fibers; and, the majority of these fibers move in a slightly larger zone than one defined by the projected area of one header upon the other. Though the distance between headers is fixed during operation, the distance is preferably adjustable to provide an optimum length of fibers, within the aforesaid ranges, between the headers.

Permeate may be withdrawn from only one, usually the upper permeate collection means (pan or end-cap), or, in skeins of large surface area greater than 200 m², from both (upper and lower) pans or end-caps. Most preferably, air is introduced between skein fibers by an air-tube potted centrally axially within the upper end-cap, the air-tube supplying air to a sparger near the base of the skein fibers, and simultaneously providing a spacer means to position and space the lower end-cap the requisite distance from the upper end-cap. The sparger is part of a gas-supply means which supplies cleansing gas. The air-tube may be internally provided with a concentric permeate withdrawal tube axially extending to the permeate collection zone in the lower end-cap, and in open fluid communication with it, to withdraw permeate from both the upper and lower end-caps. Alternatively, the permeate withdrawal tube from the lower end-cap may be externally disposed so as to withdraw permeate from a passage in the lower portion of the end-cap, the tube being led outside the skein fibers, to communicate with the permeate withdrawal tube from the upper end-cap.

Preferably, for maximum utilization of space on a header, the fibers are deliberately set in a spiral pattern by rolling a large array into a spiral roll and potting each end of the spiral roll directly in a cylindrical resin-confining means. Such resin-confining means is typically a cylindrical end-cap such as is used for PVC pipe, or, an open-ended cylindrical ring. For use, each ring of the skein is, in turn, secured in an end-cap. Whether directly potted in an end-cap, or first in a ring, then secured in an end-cap, an integral header is formed. Since, a cylindrical skein in use, requires an end-cap to serve as an integral header, an end-cap integral header will be referred to hereafter as an "end-cap" for brevity.

BRIEF DESCRIPTION OF THE DRAWINGS

The foregoing and additional objects and advantages of the invention will best be understood by reference to the following detailed description, accompanied by schematic illustrations of preferred embodiments of the invention, in which illustrations like reference numerals refer to like elements, and in which:

FIG. 2A is a bottom plan view of a potted array held as a roll in a fiber-setting form, before the end of the roll is potted in a ring, so as to form an integral header in which the pattern of fibers is spiral.

FIG. 2B is a bottom plan view of a series of potted cylindrical arrays referred to as "ring arrays" because the ends are secured in stiff cylindrical rings, the arrays being nested with each successive ring array being slid over the previous one. The nested rings are then potted in a resin-confining ring.

FIG. 2C is a bottom plan view of a series of planar arrays, the widths of each being chosen so that they may be stacked, chord-like (that is, as successive chords in the resin-confining ring) before the stack is potted in the ring.

FIGS. 3 and 3A are a cross-sectional view schematically illustrating a cylindrical skein and end-cap integral headers as in FIG. 2, except that permeate is withdrawn from only the upper header.

FIG. 13 is a bar graph showing flux (liters per meter$^2$ per hour, LMH) as a function of the orientation of a skein.

DETAILED DESCRIPTION OF PREFERRED EMBODIMENTS

Figure 1:
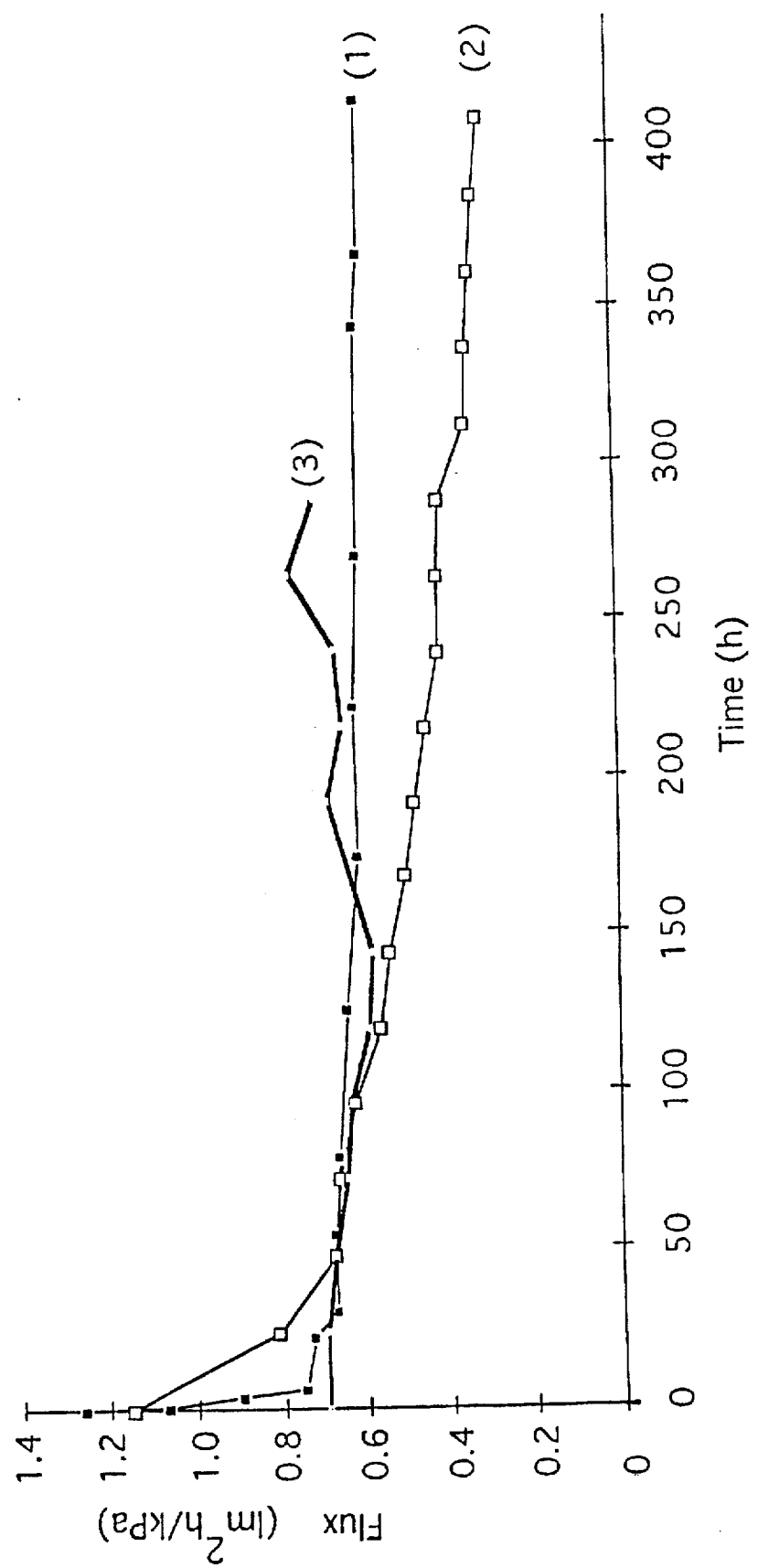
FIG. 1 is a graph in which the variation of flux is plotted as a function of time, showing three curves for three runs made with three different arrays, in each case, using the same amount of air, the identical membranes and the same membrane surface area. The results obtained by Yamamoto et al are plotted as curve 2 (under conditions modified to give them the benefit of doubt as to the experimental procedure employed, as explained below); the flux obtained using the gas-scrubbed assembly of the '424 patent is shown as curve 1; and the flux obtained using a gas-scrubbed assembly of equal surface area is shown as curve 3. The headers of the gas-scrubbed assembly are rectangular parallelpipeds.

The Cylindrical Skein and the Arrays which form it

The cylindrical skein of this invention may be used in a liquid-liquid separation process of choice, and more generally, in various separation processes. The skein is specifically adapted for use in microfiltration processes used to remove large organic molecules, emulsified organic liquids and colloidal or suspended solids, usually from water. Typical applications are (i) in a membrane bioreactor, to produce permeate as purified water and recycle biomass; for (ii) filtration of secondary effluent from wastewater treatment, to remove suspended solids and pathogenic bacteria; (iii) clarification of aqueous streams including filtration of surface water to produce drinking water (removal of colloids, long chain carboxylic acids and pathogens); (iv) separation of a permeable liquid component in biotechnology broths; (v) dewatering of metal hydroxide sludges; and, (vi) filtration of oily wastewater, inter alia.

Typically the skein is configured so that all connections for fluids entering or leaving the skein are provided in the upper header. Permeate is most preferably withdrawn through a tube passing through the upper header whether (i) the lower header collects no permeate (as explained below); or (ii) permeate collects in both the upper and lower headers. The substantially circumferential geometry of the potted skein fibers is determined by a 'fiber-setting form' used to set the fibers in a ring before they are potted. Instead of a single array rolled into a spiral, the fibers may be arranged in plural concentric arrays, or in plural flat arrays arranged chord-like in the potting ring. After potting, a star-shaped sparger or other shaped gas-distribution means is positioned near the base of the skein fibers. The skein preferably operates in a substrate held in a reservoir at atmospheric pressure or above in the range up to about 10 atm in a pressurized vessel, without being confined within the shell of a module.

One or more arrays are substantially concentrically potted about a central vertical axis in headers, the surfaces of which are in horizontal (x-y) planes. Instead of a single continuous array, plural arrays may be made and joined together, end-to-end successively, to form a much larger array which can be extended as it is rolled into a spiral roll.

Operation of the cylindrical skein is affected by (a) the fiber chosen, (b) the amount of air used, and (c) the substrate to be filtered. The goal is to filter a slow-moving or captive substrate in a large container under ambient or elevated pressure, but preferably under essentially ambient pressure, and to maximize the efficiency of a skein which does so (filters) practically and economically.

By operating at ambient pressure, mounting the integral headers of the skein within a reservoir of substrate, and by allowing the fibers restricted movement within the bubble zone in a substrate, we minimize damage to the fibers. Because, a header secures at least 10, preferably from 50 to 50,000 fibers, each generally at least 0.5 m long, in a skein, it provides a high surface area for filtration of the substrate.

The Fibers and How they are Densely Packed

The fibers divide a reservoir into a "feed zone" and a withdrawal zone referred to as a "permeate zone". The feed of substrate is introduced externally (referred to as "outside-in" flow) of the fibers, and resolved into "permeate" and "concentrate" streams. The skein, or a bank of skeins of this invention is most preferably used for microfiltration with "outside-in" flow. Though at least one skein is replaceably disposed in a small reservoir having a volume up to about 10 L (liters) and even up to about 100 L or more, a bank of skeins is preferably used in a relatively large reservoir having a volume in excess of 1000 L, such as a flowing stream, more typically a pond or tank. Most typically, a bank or plural banks with collection means for the permeate, are mounted in a large tank under atmospheric pressure, and permeate is withdrawn from the tank.

Where a bank or plural banks of skeins are placed within a tank or bio-reactor, and no liquid other than the permeate leaves the tank, it is referred to as a "dead end tank". Alternatively, a bank or plural banks may be placed within a bioreactor, permeate removed, and sludge disposed of; or, in a tank or clarifier used in conjunction with a bioreactor, permeate removed, and sludge disposed of.

The fibers used to form the skein may be formed of any conventional membrane material provided the fibers are flexible and have an average pore cross sectional diameter for microfiltration, namely in the range from about 1000 Å to 10000 Å. Typically fibers range from 1 m to about 5 m long, depending upon the dimensions of the body of substrate (depth and width) in which the skein is deployed. Preferred fibers operate with a transmembrane pressure differential in the range from 7 kPa (1 psi)–69 kPa (10 psi) and are used under ambient pressure with the permeate withdrawn under gravity. The fibers are chosen with a view to perform their desired function, and the dimensions of the skein are determined by the geometry of the headers and length of the fibers. It is unnecessary to confine a skein in a modular shell, and a skein is not.

For hollow fiber membranes, the outside diameter of a fiber is at least 20 µm and may be as large as about 3 mm, typically being in the range from about 0.1 mm to 2 mm. The larger the outside diameter the less desirable the ratio of surface area per unit volume of fiber. The wall thickness of a fiber is at least 5 µm and may be as much as 1.2 mm, typically being in the range from about 15% to about 60% of the outside diameter of the fiber, most preferably from 0.5 mm to 1.2 mm.

The number of fibers in a single array is arbitrary, typically being in the range from about 1000 to about 10000 for commercial applications, and the preferred surface area for a skein is in the range from 10 $m^2$ to 100 $m^2$. The center to center distance of adjacent fibers is preferably in the range from 1.2 (1.2d) to about 5 times (5d) the outside diameter 'd' of a fiber. Preferred center-to-center spacing is from about 1.5d to 2d. The packing density of fibers, that is, the number of fibers per unit area of header preferably ranges from 4 to 50 fibers/$cm^2$ depending upon the diameters of the fibers.

The particular method of securing the fibers in each of the headers is not narrowly critical, the choice depending upon the materials of the header and the fiber, and the cost of using a method other than potting. However, it is essential that each of the fibers be secured in fluid-tight relationship within each header to avoid contamination of permeate. This is effected by potting the fibers essentially vertically, in closely-spaced relationship, substantially concentrically.

Preferred fibers are made of organic polymers and ceramics, whether isotropic, or anisotropic, with a thin layer or "skin" on the outside surface of the fibers. Fibers may be made from braided yarn covered with a water-insoluble polymeric material such as those disclosed in U.S. Pat. No. 5,472,607. Preferred organic polymers for fibers are polysulfones, poly(styrenes), including styrene-containing copolymers such as acrylonitrile-styrene, butadiene-styrene and styrene-vinylbenzyl-halide copolymers, polycarbonates, cellulosic polymers, polypropylene, poly(vinyl chloride), poly(ethylene terephthalate), and the like disclosed in U.S. Pat. No. 4,230,463 the disclosure of which is incorporated by reference thereto as if fully set forth herein. Preferred ceramic fibers are made from alumina, by E. I. duPont deNemours Co. and disclosed in U.S. Pat. No. 4,069,157.

The Headers

One integral header of a skein is displaceable in any direction relative to the other, either longitudinally (x-axis) or transversely (y-axis), only prior to submerging the skein for operation. To use a skein, the headers are vertically spaced apart in parallel relationship within a reservoir, for example, by mounting one header above another against a vertical wall of the reservoir which functions as a spacer means. This is also true prior to spacing one header directly above another with other spacer means such as bars, rods, struts, I-beams, channels, and the like, to assemble plural skeins into a "bank or cluster of skeins" ("bank" for brevity). After assembly into a bank, a segment intermediate the potted ends of each individual fiber is displaceable along either the x- or the y-axis, because the fibers are loosely held in the skein.

Because each integral header is preferably directly potted in a ring of suitable material from which the header of cured potting resin is not removed, no gasket is required (hence referred to as "gasketless") between the cured resin of the header and the inner periphery of the ring. When the integral header is adhesively secured in an end-cap to form a permeate-collection zone, again, no gasket is required, though one may be used if the integral header is to be disassembled.

The fixing material to fix the fibers in a finished header (or fixing lamina) is most preferably either a thermosetting or thermoplastic synthetic resinous material, optionally reinforced with glass fibers, boron or graphite fibers and the like. Thermoplastic materials may be crystalline, such as polyolefins, polyamides (nylon), polycarbonates and the like, semi-crystalline such as polyetherether ketone (PEEK), or substantially amorphous, such as poly(vinyl chloride) (PVC), polyurethane and the like. Thermosetting resins commonly include polyesters, polyacetals, polyethers, cast acrylates, thermosetting polyurethanes and epoxy resins. Most preferred as a "fixing" material (so termed because it fixes the locations of the fibers relative to each other) is one which when cured is substantially rigid in a thickness of about 2 cm, and referred to generically as a "plastic" because of its hardness. Such a plastic has a hardness in the range from about Shore D 30 to Rockwell R 110 and is selected from the group consisting of epoxy resins, phenolics, acrylics, polycarbonate, nylon, polystyrene, polypropylene and ultra-high molecular weight polyethylene (UHMW PE). Polyurethane such as is commercially available under the brand names Adiprene® from Uniroyal Chemical Company and Airthane® from Air Products, and commercially available epoxy resins such as Epon 828 are excellent fixing materials.

The resulting membrane device comprises, (i) a vertical cylindrical skein of a multiplicity of restrictedly swayable fibers, together having a surface area in the range from 1 $m^2$ to 1000 $m^2$, preferably from 10 $m^2$ to 100 $m^2$, secured only in spaced-apart headers; and (ii) a gas-scrubbing means which produces a column of bubbles rising within and near the base of the skein, and engulfing the skein. Bubbles generated have an average diameter in the range from about 0.1 mm to about 25 mm, or even larger. A fluid component is selectively removed from the substrate.

The Gas-Scrubbed Assembly

A gas-scrubbed assembly comprises, (a) at least one skein, or a bank of gas-scrubbed cylindrical skeins of fibers which separate a desired permeate from a large body of multicomponent substrate having finely divided particulate matter in the range from 0.1 µm–44 µm dispersed therein, (b) each skein comprising at least 20 fibers having upper and lower terminal portions potted spaced-apart, in upper and lower end-cap integral headers ("end-caps"), respectively, the fibers being restrictedly swayable in a bubble zone, and (c) a shaped gas-distribution means adapted to provide a profusion of vertically ascending bubbles in a column above and in close proximity to the upper face of the lower header, the length of the fibers being from at least 0.1% but less than 5% greater than the distance between the opposed faces of the headers. The shaped gas-distribution means has through-passages therein through which gas is flowed, continuously or intermittently, at a flow rate which is proportional to the number of fibers. The flow rate is generally in the range from 0.47–14 cm³/sec per fiber (0.001–0.03 scfm/fiber) (standard ft³ per minute per fiber), typically in the range from 1.4–4.2 cm³/sec/fiber (0.003–0.009 scfm/fiber). The surface area of the fibers is not used to define the amount of air used because the air travels substantially vertically along the length of each fiber.

The gas-scrubbed assembly is used (i) in combination with vertically adjustable spacer means for mounting the headers in vertically spaced apart relationship, in open fluid communication with (ii) collection means for collecting the permeate; means for withdrawing the permeate; and, (iii) sufficient air to generate enough bubbles flowing upwardly through the skein, between and parallel to the fibers so as to keep the surfaces of the fibers substantially free from deposits of live microorganisms as well as small inanimate particles which may be present in the substrate.

With surprisingly little cleansing gas discharged from a sparger disposed between fibers near their base, the specific flux at equilibrium is maintained over a long period, typically from 50 hr to 1500 hr. The sparger of a gas-distribution means is disposed adjacent the upper ("fore") face of the lower header to generate a column of rising bubbles within which column the fibers are awash in bubbles. A bank of skeins may additionally be "gas-scrubbed" with one or more air-tubes disposed between the lower headers of adjacent skeins, most preferably, also adjacent the outermost fibers of the first and last skeins, so that for "n" headers there are "n+1" additional air-tubes. Each end-cap is preferably a commercially available synthetic resinous "dish" typically provided for the shell of a heat exchanger, or a "cap" for a pipe having a diameter about the same as the cylindrical skein to be formed. The upper and lower headers are cylindrical discs having the same diameter, and plural such skeins may be clustered in a single row, or multiple rows, or in a honeycomb cluster, the upper headers being interconnected for support, and the lower headers supported on the floor of the reservoir. Even skeins of different diameters may be clustered as described, if the headers are adequately intersupported in the substrate. Appropriately positioned and interconnected gas-tubes extend from a gas (air) manifold to service the bank, and an appropriate manifold is provided to withdraw permeate. The type of gas (air) manifold is not narrowly critical provided it delivers bubbles in a preferred size range from about 0.1 mm to 25 mm, measured within a distance of from 1 cm to 50 cm from the through-passages generating them.

Operation of the System

Operation of the system relies upon positioning at least one skein, preferably a bank, close to a source of sufficient air or gas to maintain a desirable flux, and, to enable permeate to be collected from at least one header. A desirable flux is obtained, and provides the appropriate transmembrane pressure differential of the fibers under operating process conditions.

The transmembrane pressure differential is preferably generated with a conventional non-vacuum pump if the transmembrane pressure differential is sufficiently low in the range from 0.7 kPa (0.1 psi) to 101 kPa (1 bar), provided the pump generates the requisite suction. A pump which generates minimal suction may be used if an adequate "liquid head" is provided between the surface of the substrate and the point at which permeate is withdrawn. Moreover, as explained in greater detail below, once the permeate flow is induced by a pump, the pump may not be necessary, the permeate continuing to flow under a "siphoning effect".

Clearly, operating with fibers subjected to a transmembrane pressure differential in the range up to 101 kPa (14.7 psi), a non-vacuum pump will provide adequate service in a reservoir which is not pressurized; and, in the range from 101 kPa to about 345 kPa (50 psi), by superatmospheric pressure generated by a high liquid head, or, by a pressurized reservoir.

A process for separating a permeate from a substrate while maintaining relatively clean surfaces of fibers in an array, comprises, submerging a skein of restrictedly swayable substantially vertical fibers within the substrate so that upper and lower end-caps of the skein are mounted one above the other with a multiplicity of fibers secured between cylindrical end-caps, the fibers having their opposed terminal portions potted in open fluid communication with at least one end-cap; the fibers operating under a transmembrane pressure differential in the range from about 0.7 kPa (0.1 psi) to about 345 kPa (50 psi), and a length from at least 0.1% to about 2% greater than the direct distance between the opposed upper and lower faces of cured resin in the end-caps, so as to present, when the fibers are deployed, a generally vertical cylindrical skein of substantially concentrically disposed fibers;

maintaining an essentially constant flux substantially the same as the equilibrium flux initially obtained, indicating that the surfaces of the fibers are substantially free from further build-up of deposits once the equilibrium flux is attained;

collecting the permeate; and, withdrawing the permeate.

The foregoing process may be used in the operation of an anaerobic or aerobic biological reactor which has been retrofitted with the membrane device of this invention. The anaerobic reactor is a closed vessel and the scrubbing gas is a molecular oxygen-free gas, such as nitrogen.

An aerobic biological reactor may be retrofitted with at least one gas-scrubbed bank of vertical cylindrical skeins, each skein made with from 500 to 5000 fibers in the range from 1 m to 3 m long, in combination with a permeate collection means, to operate the reactor without being encumbered by the numerous restrictions and limitations imposed by a secondary clarification system.

Typically, there is no cross flow of substrate across the surface of the fibers in a "dead end" tank. If there is any flow of substrate through the skein in a dead end tank, the flow is due to aeration provided beneath the skein, or to such mechanical mixing as may be employed to maintain the solids in suspension. There is generally more flow and higher fluid velocity through the skein in a tank into which substrate is being continuously flowed, but the velocity of fluid across the fibers is generally too insignificant to deter growing microorganisms from attaching themselves, or suspended particles, e.g. microscopic siliceous particles, from being deposited on the surfaces of the fibers.

FIG. 1 presents the results of a comparison of three runs made, one using the teachings of Yamamoto in his '89 publication (curve 2), but using an aerator which introduced air from the side and directed it radially inwards, as is shown in Chiemchaisri et al. A second run (curve 1) uses the gas-scrubbed assembly of the '424 patent, and the third run (curve 3) uses a gas-scrubbed skein as described herein except that the headers were rectangular parallelepipeds. The specific flux obtained with an assembly of an inverted parabolic array with an air distributor means (Yamamoto et al), as disclosed in *Wat. Sci. Tech.* Vol. 21, Brighton pp 43–54, 1989, and, the parabolic array by Cote et al in the '424 patent, are compared to the specific flux obtained with the vertical skein of this invention.

The comparison is for the three assemblies having fibers with nominal pore size 0.2 μm with essentially identical bores and surface area in 80 L tanks filled with the same activated sludge substrate. The differences between the stated experiment of Yamamoto et al. and that of the '424 patent are of record in the '424 patent, and the conditions of the comparison are incorporated by reference thereto as if fully set forth herein. The vertical skein used herein differs from the '424 skein only in the vertical configuration of the 280 fibers, each of which was about 1% longer than the distance between the spaced apart headers during operation. The flow rate of air for the vertical skein is 1.4 $m^3/hr/m^2$ using a coarse bubble diffuser.

It will be evident from FIG. 1 in which the specific flux, liters per $meter^2$ per hr per unit pressure (conventionally written as (Lmh/kPa), is plotted as a function of operating time for the three assemblies, that the curve, identified as reference numeral 3 for the flux for the vertical skein, provides about the same specific flux as the parabolic skein, identified as reference numeral 1. As can be seen, each specific flux reaches an equilibrium condition within less than 50 hr, but after about 250 hr, it is seen that the specific flux for the inverted parabolic array keeps declining but the other two assemblies reach an equilibrium.

Figure 2:
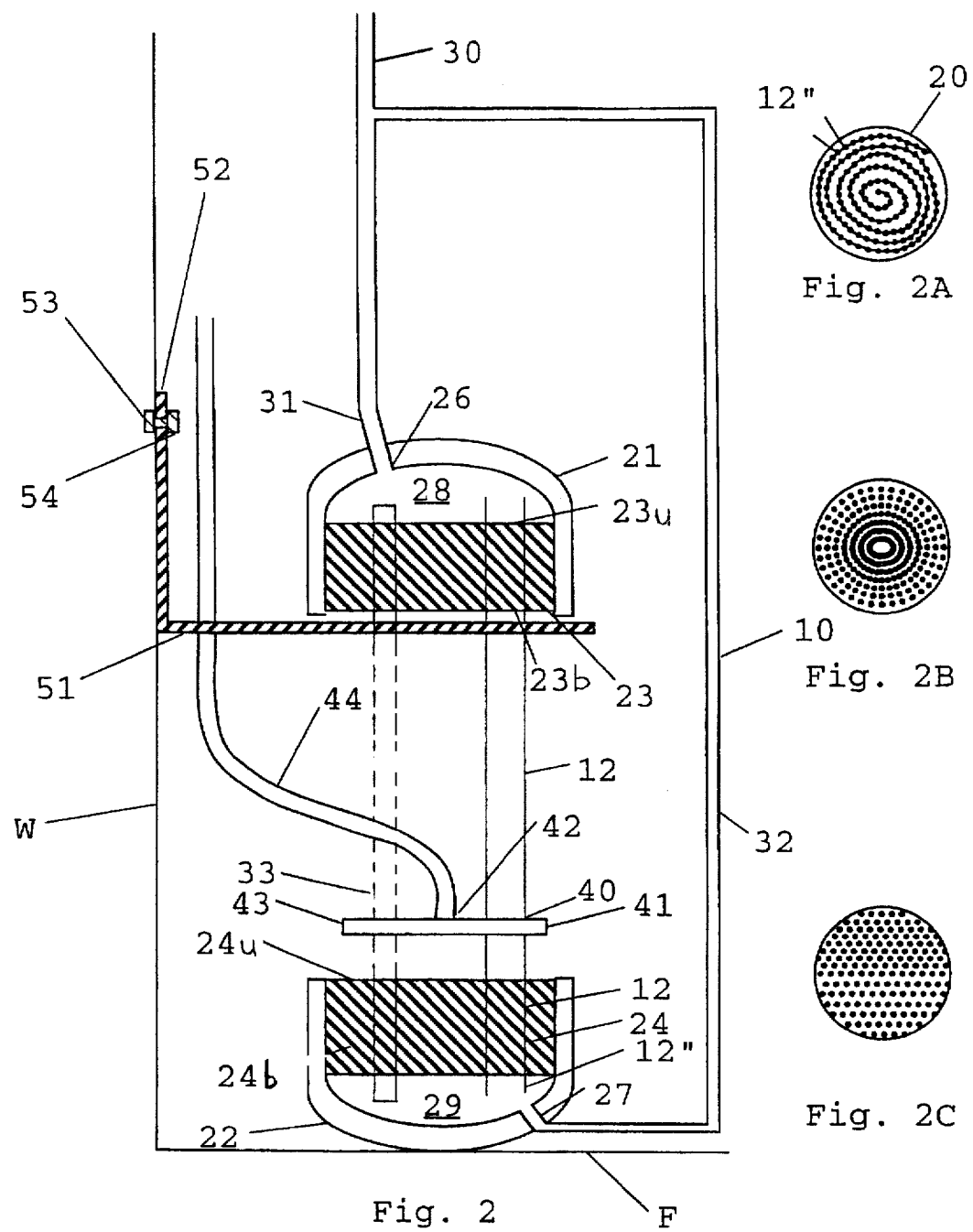
FIG. 2 is a cross-sectional view schematically illustrating a cylindrical skein having upper and lower end-cap integral headers in each of which is directly potted an array of fibers in a finished header sealed at its periphery to the wall of the end-cap without a gasket; permeate is withdrawn separately from the upper and lower headers and the draw from each combined in a permeate withdrawal manifold. Except for the lower end-cap resting on the floor of the tank, or otherwise supported in the substrate, the skein is unsupported during operation. By "unsupported" is meant 'not supported except for spacer means to space the headers'.

Referring to FIG. 2 there is schematically illustrated, in cross-sectional view a vertical cylindrical skein 10, comprising a pair of similar upper and lower end-caps 21 and 22 respectively which serve as cylindrical permeate collection pans. Skein fibers are unsupported and unattached one to another intermediate the headers; permeate is withdrawn separately from the upper and lower headers and the draw from each combined in a permeate withdrawal manifold. Each "end-cap" has a finished upper/lower header formed directly in it, upper header 23 being substantially identical to lower header 24. Each header is formed by potting fibers 12 in a potting resin such as a polyurethane or an epoxy of sufficient stiffness to hold and seal the fibers under the conditions of use. An end-cap was found especially convenient for making relatively small surface area skeins because an end-cap for poly(vinyl chloride) "PVC" pipe serves as an excellent header and is commercially readily available; for large surface area skeins, commercially available larger headers are provided by glass fiber reinforced end-caps for cylindrical tanks. Though the fibers 12 are not shown as close together as they would normally be, it is essential that the fibers are not in contact with each other, but that they be spaced apart by the cured resin between them. It is also essential that the potting resin adhere to and seal the lower portions 12' of each of the fibers against leakage of fluid under operating conditions of the skein. Visual confirmation of a seal is afforded by the peripheries of the fibers being sealed at the upper (fore) and lower (aft) faces 23u and 23b of the upper header 23, and the fore and aft faces 24u and 24b respectively of the lower header 24. A conventional finished header may be used in which the ends 12" of the fibers would be flush (in substantially the same plane) as the lower face 24b. In the best mode, though not visible through an opaque end-cap, the open ends 12" of the fibers protrude from the headers's lower (aft or bottom) face 24b.

The finished upper header 23 (fixing lamina) is left adhered to the periphery of the end-cap 21 when the fugitive lamina is removed through a bore 26 in the upper header; and analogously, the finished lower header 24 is left adhered to the periphery of the end-cap 22 when the fugitive lamina is removed through a bore 27. The bores 26 and 27 in the upper and lower end-caps have permeate withdrawal tubes 31 and 32, respectively, connected in fluid-tight engagement therein. The permeate tubes 31 and 32, in turn, are connected to a permeate withdrawal manifold 30.

A detail of a sparger 40 is provided in FIG. 3A The star-shaped sparger 40 having radially outwardly extending tubular arms 41 and a central supply stub 42, supplies air which is directed into the tubular arms and discharged into the substrate through air passages 43 in the walls of the arms. An air feed tube 44 connected to the central supply stub 42 provides air to the sparger 40. The lower end of the central stub 42 is provided with short projecting nipples 45 the inner ends of which are brazed to the stub. The outer ends of the nipples are threaded. The central stub and nipples are easy to insert into the center of the mass of skein fibers. When centrally positioned, arms 41 which are threaded at one end, are threadedly secured to the outer ends of the nipples.

As illustrated in FIG. 2, lower end-cap 22 rests on the floor F of a tank, near a vertical wall W to which is secured a vertical mounting strut 52 with appropriate fastening means such as a nut 53 and bolt 54. A U-shaped bracket 51 extends laterally from the base of the mounting strut 52. The arms of the U-shaped bracket support the periphery of upper end-cap 21, and to ensure that the end-cap stays in position, it is secured to the U-shaped bracket with a right angle bracket and fastening means (not shown). A slot in mounting strut 52 permits the U-shaped bracket to be raised or lowered so that the desired distance between the opposed faces 23b and 24u of the upper and lower headers respectively is less than the length of any potted fiber, measured between those faces, by a desired amount. Adjustability is particularly desirable if the length of the fibers tends to change during service.

Instead of withdrawing permeate through both tubes 31 and 32 it may be desirable to withdraw permeate from both the upper 21 and lower end-caps through only the upper tube 31. If it is, a permeate connector tube 33 (shown in phantom outline), is inserted within the mass of skein fibers 12 through the headers 23 and 24, connecting the permeate collection zone 29 in the lower end-cap in open fluid communication with the permeate collection zone 28 in the upper end-cap; and, bore 27 is plugged.

Figure 3:
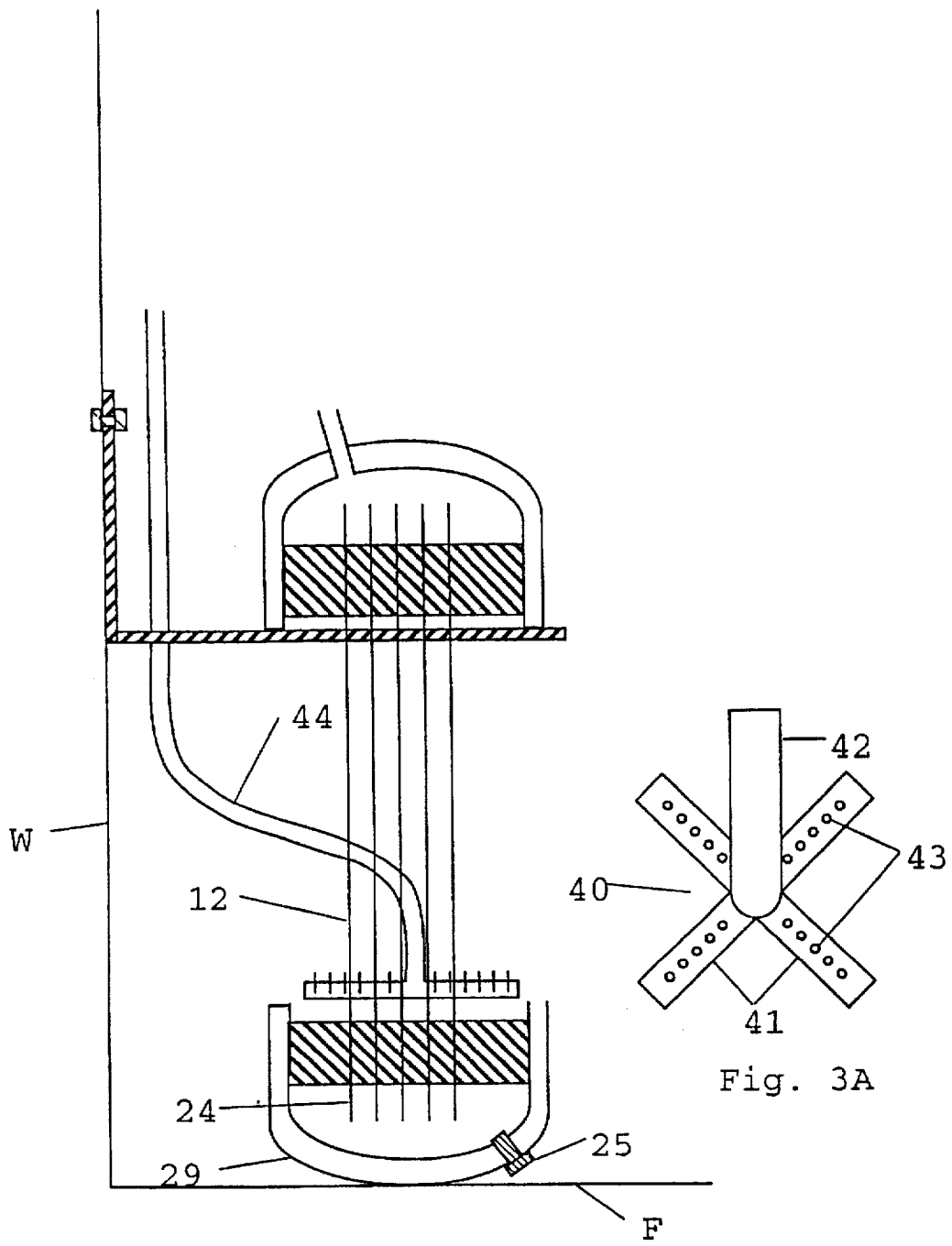

As illustrated in FIG. 3, in the event that withdrawal of permeate from the upper permeate collection zone 28 alone is sufficient, and it is unnecessary to withdraw permeate from both the upper and lower zones 28 and 29, the lower bore 27 of the lower end-cap 22 is simply plugged with a plug 25. Since, under such circumstances, it does not matter if the lower ends 12" of the fibers are plugged, and permeate collection zone 29 serves no essential function, the zone 29 may be filled with potting resin.

Figure 4:
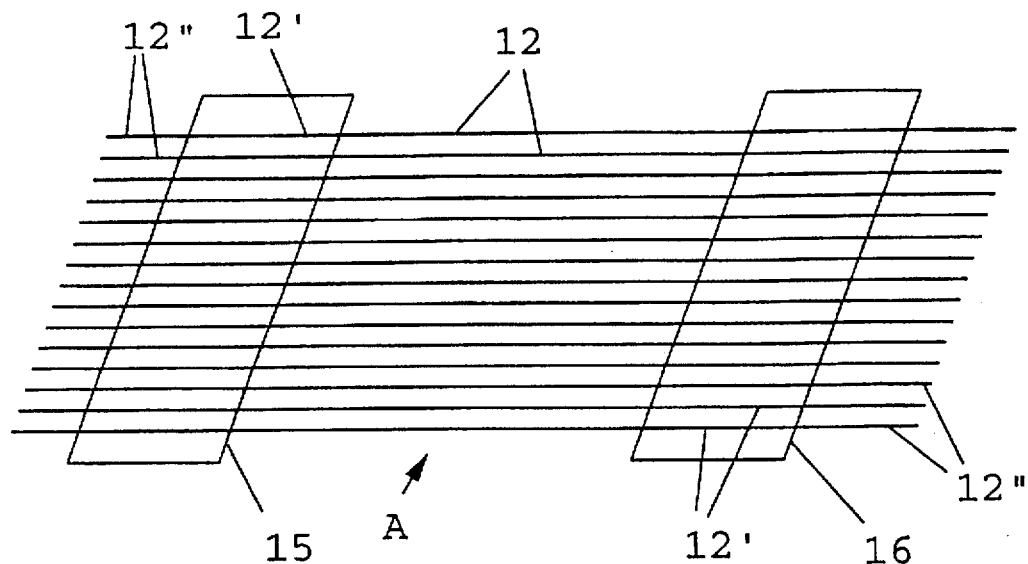
FIG. 4 is a perspective view of a single array, schematically illustrated, of a row of substantially coplanarly disposed parallel fibers secured near their opposed terminal ends between spaced apart cards. Typically, a single such array with a large number of fibers is rolled up before being sequentially potted.

The step-wise procedure for forming an array to be potted in the novel header is described with respect to an array "A" illustrated in FIG. 4, as follows:

A desired number of fibers 12 are each cut to about the same length with a sharp blade so as to leave both opposed ends of each fiber with an essentially circular cross-section. The fibers are coplanarly disposed side-by-side in a linear array on a flexible planar support means such as strips or cards 15 and 16 which can be formed into a loose roll. Preferably strips of stiff paper are coated with an adhesive, e.g. a commercially available polyethylene hot-melt adhesive, so that the fibers are glued to the strips and opposed terminal portions 12" respectively of the fibers, extend beyond the strips. The strips securing the fibers extend over only the intermediate portions 12' of the fibers. Alternatively, to avoid gluing fibers to the strips, flexible strips of an elastomeric material such as a 50–90 Shore A polyurethane having pre-formed parallel spaced-apart grooves therein into which the opposed ends of fibers may be snugly held, can be used.

Figure 5:
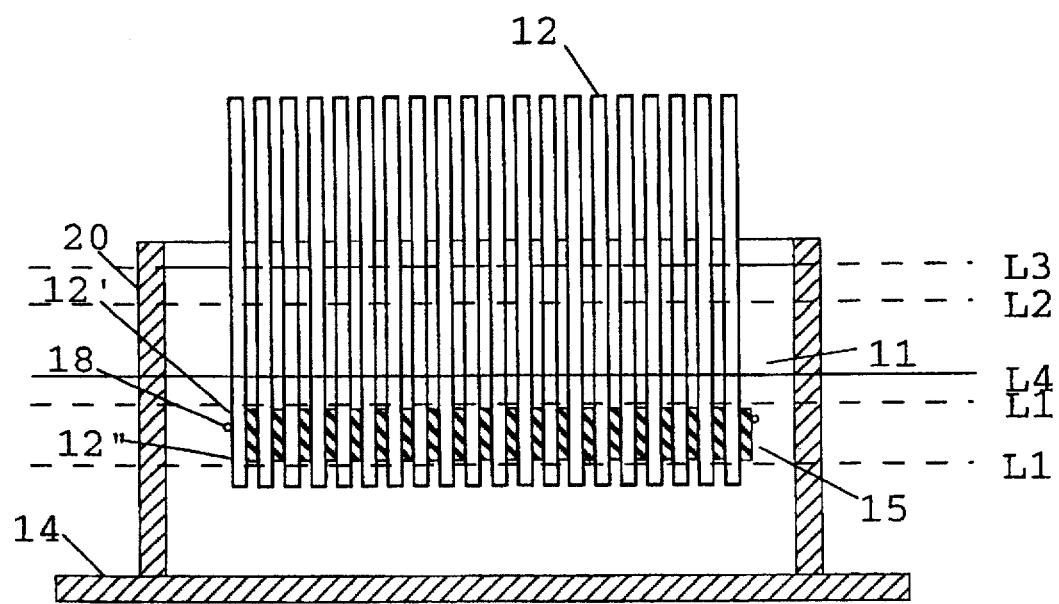
FIG. 5 illustrates a side elevational view of a cylindrical skein of fibers, with the ends of the fibers on a rolled strip potted in a ring clamped to a panel coated with a release coating, to describe in detail how a finished header is formed.

Referring to FIG. 5 there is schematically illustrated the position of a spiral roll of an array of fibers which roll is secured with a rubber band 18 or other clamping means as it is held for potting in ring 20 which is clamped (not shown) tightly to a flat plate 14 so as to seal the periphery of ring 20 against the plate. The thickness of a strip and/or adhesive is sufficient to ensure that the fibers in successive layers of the roll are kept spaced apart. Preferably, this thickness is about the same as, or relatively smaller than the outside diameter of a fiber, preferably from about 0.5d to 1d thick, which becomes the spacing between adjacent outside surfaces of fibers in successive layers of the spiral. FIG. 2A illustrates the spiral pattern of openings in the ends 12" of the fibers, obtained when the spiral roll is potted in a potting ring 20.

In another embodiment, a series of successively larger diameter circular arrays may be formed, each a small predetermined amount larger than the preceding one, and the arrays secured, preferably adhesively, one to the next, near their upper and lower peripheries respectively to form a dense cylindrical mass of fibers. In such a mass of fibers, each array is secured both to a contiguous array having a next smaller diameter, as well as to a contiguous array having a next larger diameter, except for the innermost and outermost arrays which have the smallest and largest diameter, respectively. After the nested arrays are potted in ring 20, the resulting pattern of concentric circles formed by the open lower ends 12" of the fibers in the lower face 24b of the lower header is illustrated in FIG. 2B.

To make a skein with plural arrays arranged chord-like within a ring 20 or resin-confining means, plural planar arrays are formed on pairs of strips, each having a length corresponding to its position as a chord within a potting ring in which the skein fibers are to be potted. That is, each array is formed on strips of diminishing width, measured from the central array which is formed on a strip having a width slightly less than the inner diameter of the ring 20 in which the stack is to be potted. The arrays are stacked within the ring, the widest array corresponding in position to the diameter of the ring. For a chosen fiber, the larger the surface area required in a skein, the greater the number of fibers in each array, the bigger the diameter of the ring, and the wider each chord-like array. The plural arrays are preferably adhered one to the other by coating the surfaces of fibers with adhesive prior to placing a strip of the successive array on the fibers. Alternatively, the stacked arrays may be held with a rubber band before being inserted in the potting ring. The resulting chord-like pattern of the open lower ends 12" of the fibers in the lower face 24b of the lower header is illustrated in FIG. 2C. Ease of handling and the desired density of fibers per unit area of header will normally determine the choice of an embodiment for forming the potted skein.

Referring further to FIG. 5, the ring 20 serves the function of potting pan for forming the upper and lower headers. After the skein fibers are potted in finished headers, and the fibers checked for leaks so that any individual defective fiber may be plugged, the ring is snugly held in an end-cap (not shown) which serves as a permeate collection pan. The ring 20 may be adhesively secured in the end-cap or is held in fluid-tight engagement with it using a circumferential gasket. Whether the strips separating successive rows of fibers are to be retained will determine the depth L1 or L1' of fugitive header. The header of fixing material (thickness L1–L2) may have a cushioning layer (thickness L2–L3). If a gasketing lamina is desired, when the header is to be secured above a permeate pan, a liquid gasketing material is poured and cured over the fugitive lamina to provide the gasketing lamina of thickness L1–L4.

The description of the method of forming a header is detailed in the '119 parent application, and in the '921 provisional application, which description is incorporated by reference thereto as if fully set forth herein.

The restricted swayability of the fibers generates some intermittent 'snapping' motion of the fibers which may break the potted fibers around their circumferences, at the interface of the fore face and substrate. To combat such damage, the fixing material is preferably chosen so as to provide adequate cushioning of the fibers at the interface. Such a material is typically an elastomer having a hardness in the range from 50 Shore A to about 20 Shore D.

Where a chosen fixing material is so hard as to cause the aforesaid damage, it is minimized by providing an additional lamina of material which is softer than the fixing lamina, to serve as a cushioning lamina. Such a cushioning lamina is formed integrally with the fixing lamina, by pouring cushioning liquid (so termed for its function when cured) over the fixing lamina to a desired depth sufficient to provide enough 'give' around the circumferences of the fibers to minimize the risk of shearing. Such cushioning liquid, when cured is rubbery, having a hardness in the range from about Shore A 30 to Shore D 20, and is preferably a polyurethane or silicone or other elastomeric material which will adhere to the fixing lamina. Upon removal of the fugitive lamina, the finished header thus formed has the combined thicknesses of the fixing lamina and the cushioning lamina, when the strips 15 are cut away.

As illustrated in FIGS. 2 and 3, a finished integral header may be directly formed in end-caps 21 and 22 into which permeate is to flow, thus solving the problem of sealing a conventionally formed and demolded header in a permeate pan.

Figure 6:
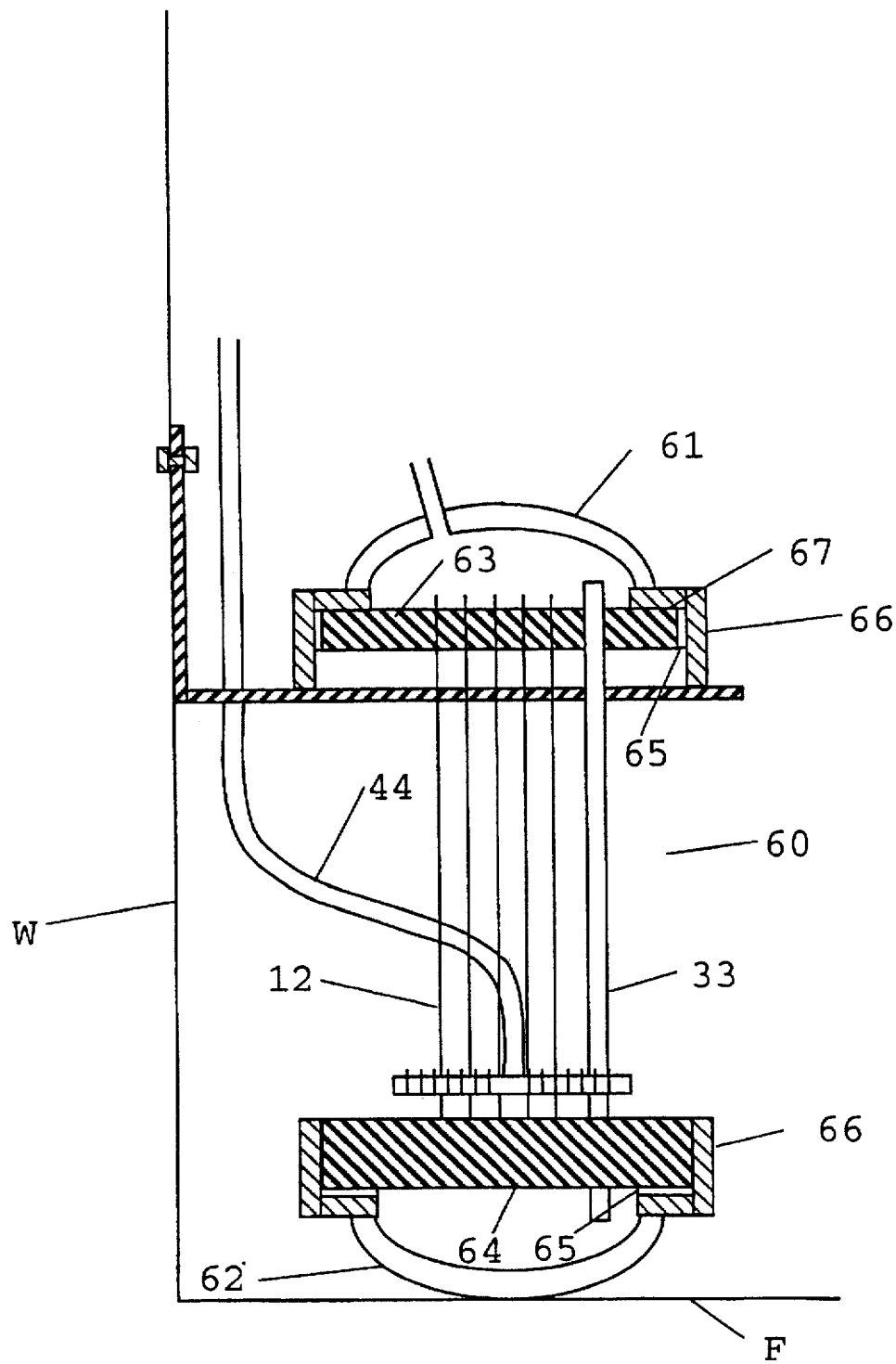
FIG. 6 is a side elevational view schematically illustrating another embodiment of a cylindrical skein in which a conventionally formed header is hend in a permeate pan and permeate is withdrawn from the lower end-cap into the upper end-cap through a rigid permeate tube inserted through both the upper and lower headers. Terminal portions of a permeate connector tube are held in fluid-tight engagement with the upper and lower headers so that the permeate tube functions as a spacer means, and at the same time, as a support for the upper end-cap.

Referring to FIG. 6 there is schematically illustrated a skein 60 with conventionally formed and demolded upper and lower headers 63 and 64 respectively potting the terminal portions of fibers 12. Each header is formed as described in U.S. Pat. No. 5,202,023. The ends of fibers in an array held in a spiral roll with a rubber band are dipped in resin or paint to prevent resin penetration into the bores of the fibers during the potting process. The ends of the roll are then placed in a mold and uncured resin added to saturate the ends of the fibers and fill the spaces between the individual fibers in the roll. The cured, molded ends are removed from the molds and the molded ends cut off (see, bridging cols 11 and 12).

Upper header 63 is placed against the lip 67 of a stainless steel permeate pan 61 and sealed in it with a peripheral gasket 65 placed circumferentially between the vertical wall of the header 23 and the vertical peripheral surface of the wall 66 of the permeate pan; alternatively, as illustrated in lower permeate pan 62, the gasket 65 may be placed between the lower peripheral surface of the lower header 64 and the peripheral lip 67 on which the header rests. A suitable sealing gasket or sealing compound typically used is a polyurethane or silicone resin. The periphery of each header is secured to its respective permeate pan with screws or other suitable fastening means to ensure a fluid-tight seal. The strips on which the array of fibers was held prior to being potted remain in the header, though not shown in the Figure.

As seen, the open ends of the embedded terminal portions 12' of the fibers are in the same plane as the lower face of the header 11 because the fibers are conventionally potted and the header sectioned to expose the open ends. In this prior art method, sectioning the mold unavoidably damages at least some, and typically, a substantial number of the embedded fibers. Permeate connector tube is press-fitted when it is inserted in through-bores in the upper and lower headers after they are demolded and the plugged ends of the fibers cut away. As before, the skein is provided with a sparger 40 supplied by a flexible air supply tube 44 and the lower permeate pan 62 rests on floor F of a tank. The upper permeate pan rests on a U-shaped bracket 51 positioned so as to provide the desired slack in the fibers 12.

In the most preferred embodiment the novel method of potting disclosed herein is used. Because this method denies ready access to the ends of the fibers once finished headers are formed within a ring or an end-cap, the ends of the fibers protrude from the lower face 24b of the lower header 24 and the upper face 23u of the upper header 23 into the respective permeate collection zones.

Figure 7:
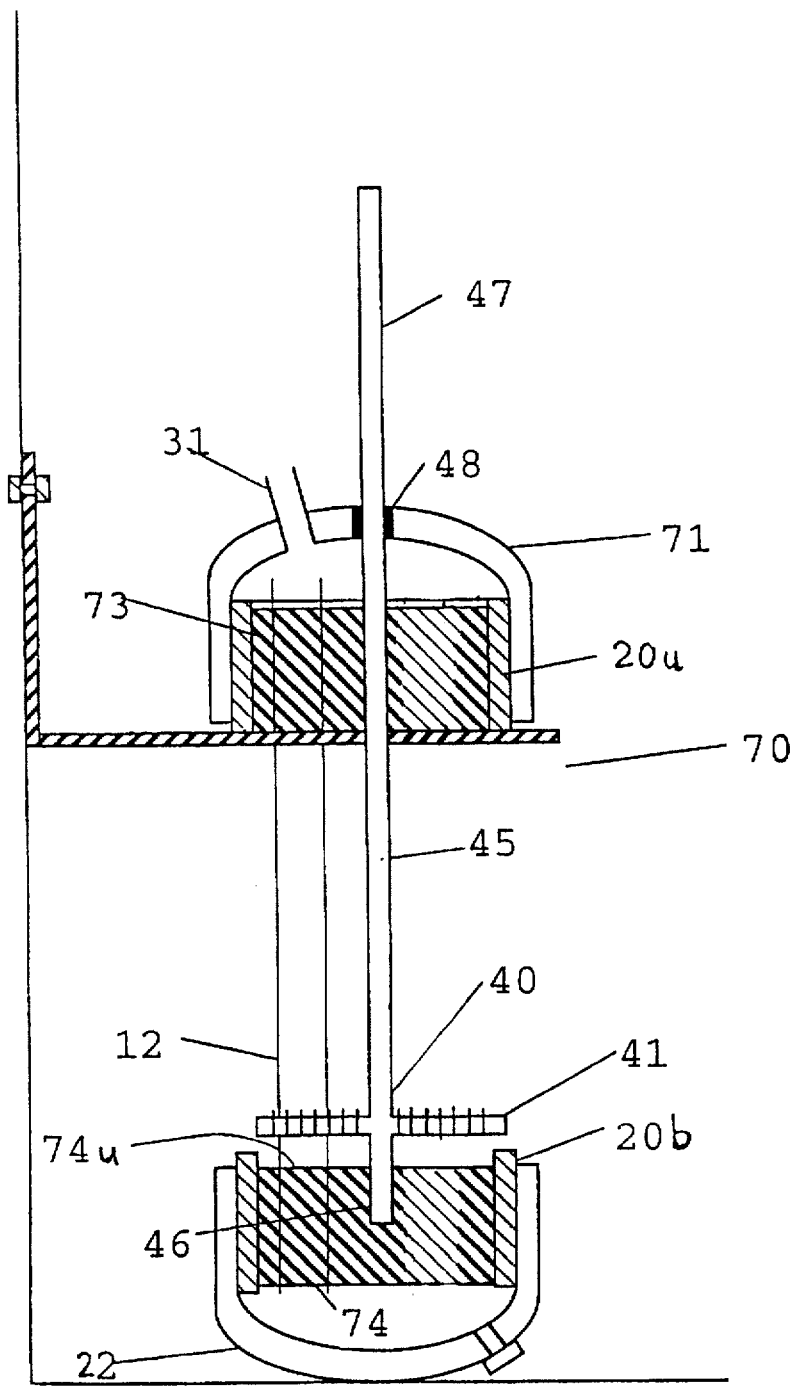
FIG. 7 is a side elevational view schematically illustrating a cylindrical skein in which a ring header is formed first. The ring header is then sealed into an end-cap. In addition to the permeate tube, a rigid air supply tube is inserted through the upper end-cap and upper header into the central portion of the skein, the lower portion of the air supply tube being potted in the lower header, thus functioning as a spacer means, and at the same time, as a support for the upper end-cap.

Referring to FIG. 7 there is illustrated a skein 70 with upper and lower end-caps in which are sealed upper and lower ring headers formed in upper and lower rings 20u and 20b respectively, after the fibers in the skein are tested to determine if any is defective. Before an array is rolled into a spiral, as before, a sparger 40 with a rigid air-supply tube 45 is placed in the array so that upon forming a spiral roll the air-supply tube is centrally axially held within the roll. The lower end of the roll is then potted forming a lower finished header 74 in which the lower end 46 of the air-supply tube is potted, fixing the position of the arms 41 of the sparger just above the upper face 74u of the header 74.

In an analogous manner, an upper header 73 is formed in ring 20u and a permeate connector tube 33 press-fitted into aligned through-bores in the upper and lower headers. Upper end 47 of air-supply tube 45 is inserted through an axial bore 48 within upper end-cap 71 which is slipped over the ring 20u the outer periphery of which is coated with a suitable adhesive, to seal the ring 20u in the end-cap 71. The periphery of the upper end 47 is sealed in the end cap 71 with any conventional sealing compound.

Figure 8:
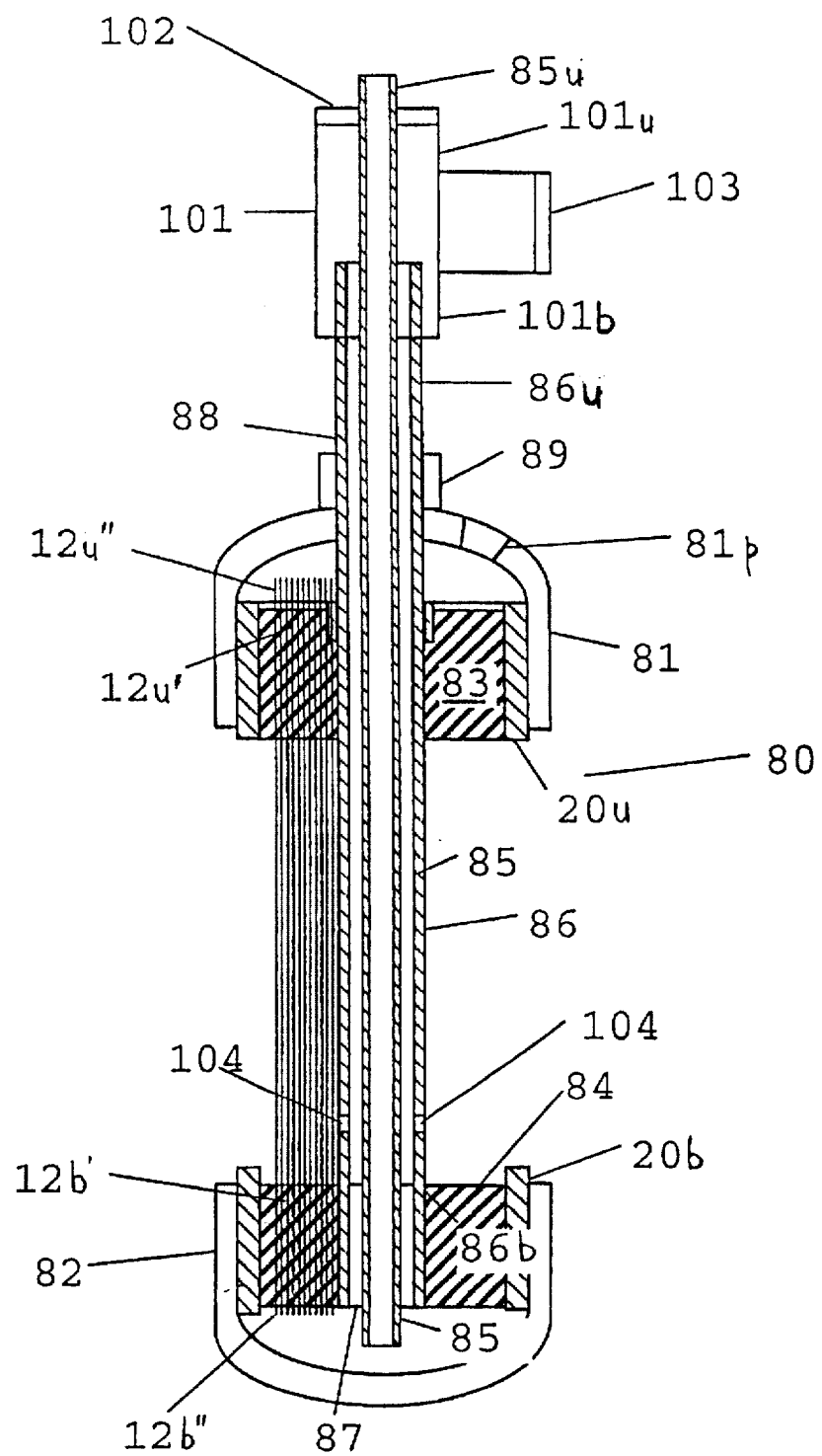
FIG. 8 illustratively shows another embodiment of the skein in which the permeate tube is concentrically disposed within the air supply tube, and both are potted, near their lower ends in the lower header. Ports in the lower end of the air supply tube provide air near the base of the skein fibers.

Referring to FIG. 8 there is schematically illustrated another embodiment of a skein 80 in which rigid permeate tube 85 is held concentrically within a rigid air-supply tube 86 which is potted axially within skein fibers 12 held between opposed upper and lower headers 83 and 84 in upper and lower rings 20u and 20b which are in turn sealed in end-caps 81 and 82 respectively. For ease of manufacture, the lower end 85b of permeate tube 85 is snugly fitted and sealed in a bushing 87. The bushing 87 and end 85b are then inserted in the lower end 86b of the air supply tube 86 and sealed in it so that the annular zone between the outer surface of permeate tube 85 and the inner surface of air supply tube 86 will duct air to the base of the fibers but not permit permeate to enter the annular zone. The air supply tube is then placed on an array and the array is rolled into a spiral which is held at each end with rubber bands. The lower end of the roll is placed in a ring 20b and a lower ring header is formed with a finished header 84 as described above. It is preferred to use a relatively stiff elastomer having a hardness in the range from 50 Shore A to about 20 Shore D, and most preferred to use a polyurethane having a hardness in the range from 50 Shore A to about 20 Shore D, measured as set forth in ASTM D-790, such as PTU-921 available from Canadian Poly-Tech Systems. To form the upper finished header 83 the air supply tube is snugly inserted through an O-ring held in a central bore in a plate such as used in FIG. 5, to avoid loss of potting resin from the ring 20, and the fugitive resin and finishing resins poured and cured, first one then the other, in the ring. Lower finished header 84 is formed with intermediate portions 12b' embedded, and terminal portions 12b" protruding from the header's aft face. Upper finished header 83 is formed with intermediate portions 12u' embedded, and terminal portion 12u" protruding from the header's fore face. After the finished headers 83 and 84 are formed and the fibers checked for defects, the upper end 86u of the air supply tube 86 is inserted through a central bore 88 in upper end-cap 81 and sealed within the bore with sealing compound or a collar 89. Preferably the permeate tube 85, the air supply tube 86 and the collar 89 are all made of PVC so that they are easily cemented together to make leak-proof connections.

As shown, permeate may be withdrawn through the permeate tube 85 from the permeate collection zone in the lower end-cap 82, and separately from the upper end-cap 81 through permeate withdrawal port 81p which may be threaded for attaching a pipe fitting. Alternatively, the permeate port 81p may be plugged and permeate withdrawn from both end-caps through the permeate tube 85.

Upper end 85u of permeate tube 85 and upper end 86u of air supply tube 86 are inserted through a T-fitting 101 through which air is supplied to the air supply tube 86. The lower end 101b of one of the arms of the T 101 is slip-fitted and sealed around the air supply tube. The upper end 101u of the other arm is inserted in a reducing bushing 102 and sealed around the permeate tube. Air supplied to intake 103 of the T 101 travels down the annular zone between the permeate tube and the air supply tube and exits through opposed ports 104 in the lower portion of the air supply tube, just above the upper face 84u of the lower header 84. It is preferred to thread ports 104 to threadedly secure the ends of arms 41 to form a sparger which distributes air substantially uniformly across and above the surface 84u. Additional ports may be provided along the length of the vertical air supply tube, if desired.

Figure 9:
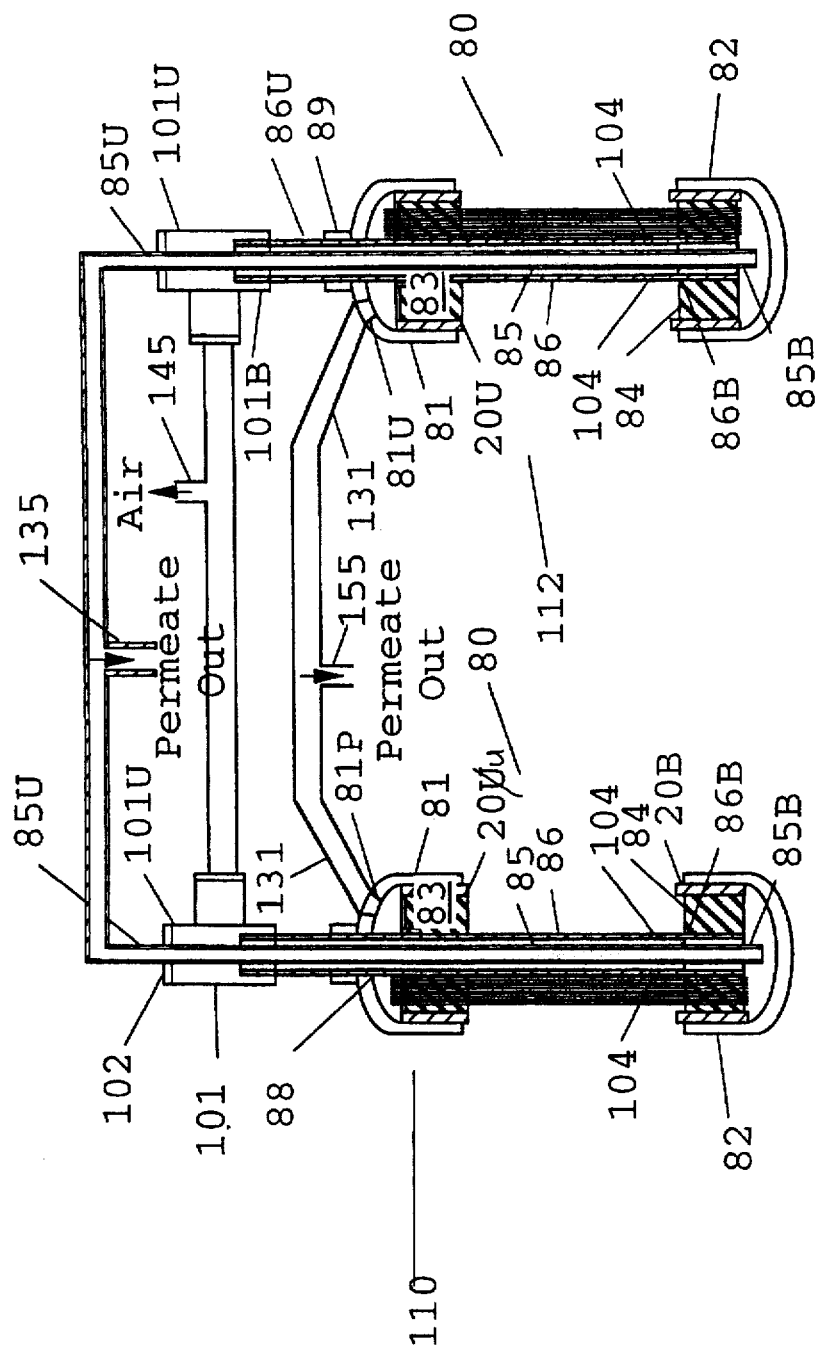
FIG. 9 is a perspective view schematically illustrating a pair of skeins in a bank in which the upper headers are supported on brackets on the vertical wall of a tank and the lower headers rest on the floor. The skeins in combination with a gas-distribution means form a "gas-scrubbing assembly" deployed within a substrate, with the fibers suspended essentially vertically in the substrate.

Referring to FIG. 9 there is shown a bank 110 of a pair of side-by-side skeins 111 and 112 substantially identical to skein 80 shown in FIG. 8, mounted in substrate against a wall W of a tank. The permeate withdrawal tubes 85 are manifolded to a common permeate manifold 135 and the T-fittings 101 for the air supply tubes 86 are manifolded to a common air supply 145. Permeate withdrawal tubes 131 are manifolded to a separate manifold 155 to provide greater flexibility than if manifolded with withdrawal tubes 85, and also to permit flushing the skein fibers. All connections to conduits to the bank are made to the upper end-caps for ease of operation. A skein with relatively low surface area may have as few as 100 fibers, while a skein with relatively large surface are may have as many as 2500 fibers, or more.

When permeate is withdrawn in the same plane as the permeate withdrawal manifold, and the transmembrane pressure differential of the fibers is in the range from 35–75 kPa (5–10 psi), the manifold may be connected to the suction side of a centrifugal pump which will provide adequate NPSH.

In general, it is preferred to withdraw permeate from both the upper and lower headers, until the flux declines to so low a level as to require that the fibers be backwashed or backflushed. The skeins may be backwashed by introducing a backwashing fluid through the permeate manifold under sufficient pressure to force the fluid through the pores of the membranes. This may be done in a skein having the configuration shown in FIGS. 2, 3, 6 and 7. The fibers may be backflushed in skeins 111 and 112 in the same manner as the skein shown in FIG. 8. Backflushing fluid is introduced through one permeate tube (as for example one connected to permeate port 81p) and removed through the other permeate tube (85). The skeins 111 and 112 may also be backwashed by blocking flow of permeate through one manifold and pressuring backwashing fluid through the other permeate manifold.

Figure 10:
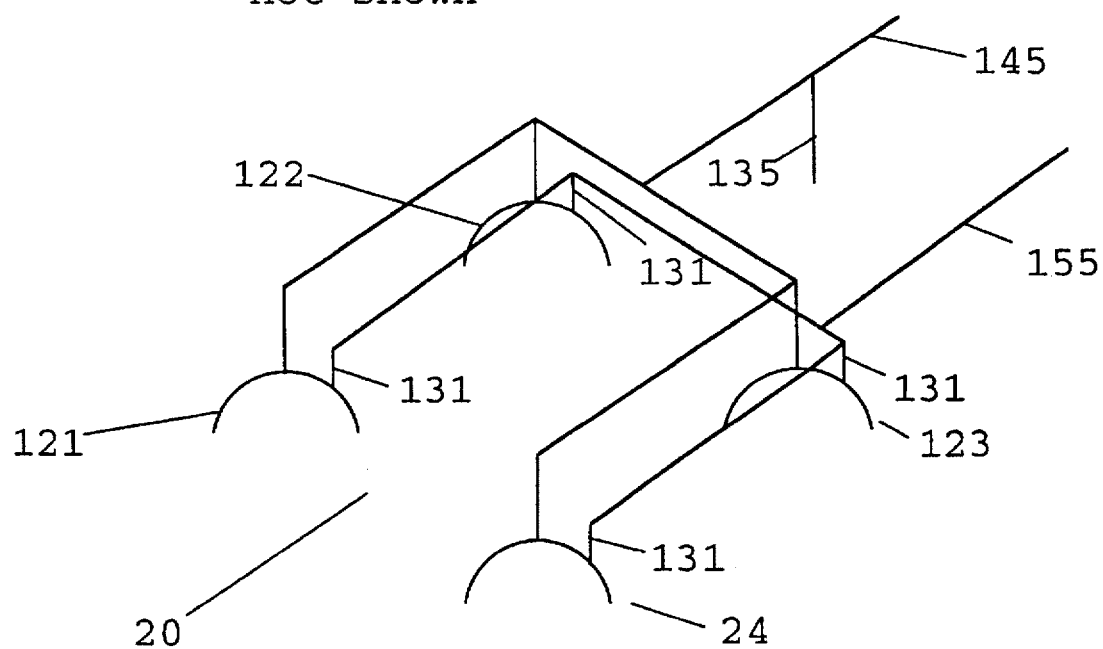
FIG. 10 is an elevational view schematically illustrating a "stand-alone" cluster of skeins.

Referring to FIG. 10, there is schematically illustrated another embodiment of an assembly, referred to as a "stand-alone" bank or cluster 120 of skeins, four of which are referenced by numerals 121, 122, 123 and 124. The cluster is referred to as being a "stand-alone" because the spacer means between end-caps is provided by the concentric air-supply and permeate tubes potted in the headers. A cluster is usually used when mounting the skeins against the wall of a reservoir is less effective than placing the cluster in spaced-apart relationship from a wall of the tank. In other respects, the cluster 120 is analogous to the wall-mounted bank 110 illustrated in FIG. 9. As will now be evident, the number of skeins connected in a cluster is limited only by the connections provided to manifold the skeins adequately.

In the best mode illustrated, each upper end-cap is provided with rigid PVC tubular nipples adapted to be coupled with fittings such as ells and tees to the appropriate manifolds.

Figure 12:
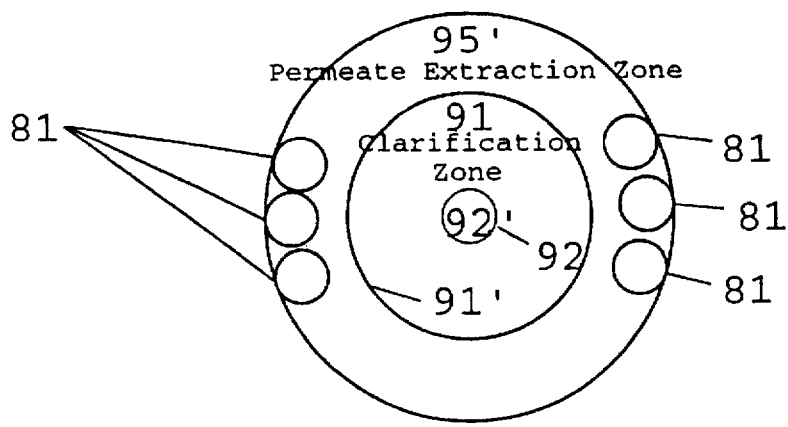
FIG. 12 is a plan view of the bioreactor shown in FIG. 11 showing how multiple banks of skeins may be positioned around the circumference of the bioreactor to form a large permeate extraction zone while a clarification zone is formed in the central portion with the help of baffles.
Figure 11:
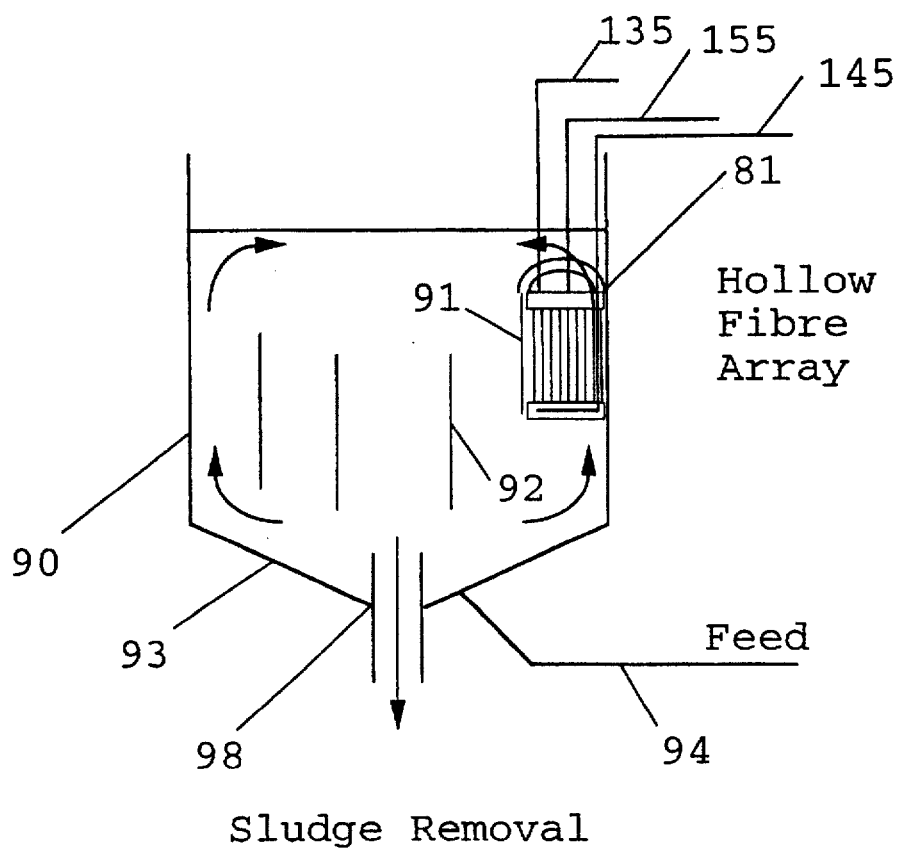
FIG. 11 is an elevational view schematically illustrating a bank of skeins mounted against the wall of a bioreactor, showing the convenience of having all piping connections outside the liquid.

In another embodiment of the invention, a bioreactor is retrofitted with plural banks of skeins schematically illustrated in the elevational view shown in FIG. 11, and the plan view shown in FIG. 12. The clarifier tank is a large circular tank 90 provided with a vertical, circular outer baffle 91, a vertical circular inner baffle 92, and a bottom 93 which slopes towards the center (apex) for drainage of accumulating sludge. Alternatively, the baffles may be individual, closely spaced rectangular plates arranged in outer and inner circles, but continuous cylindrical baffles (shown) are preferred. Irrespective of which baffles are used, the baffles are located so that their bottom peripheries are located at a chosen vertical distance above the bottom. Feed is introduced through feed line 94 in the bottom of the tank 90 until the level of the substrate rises above the outer baffle 91.

A bank 210 of plural side-by-side skeins, analogous to those in the bank 110 depicted in FIG. 9, is deployed against the periphery of the inner wall of a bioreactor 90 with suitable mounting means in an outer annular permeate extraction zone 95' (FIG. 12) formed between the circular outer baffle 91 and the wall of the tank 90, at a depth sufficient to submerge the fibers. A clarification zone 91' is defined between the outer circular baffle 91 and inner circular baffle 92. The inner circular baffle 92 provides a vertical axial passage 92' through which substrate is fed into the tank 90. The side-by-side skeins form a dense curtain of fibers hanging vertically between upper 81 and lower 82 end-caps. Permeate is withdrawn through permeate manifolds 135 and 155 and air is introduced through air-manifold 145, extending along the inner wall of the tank and branching out with connections to adjacent end-caps. Because air is sparged between fibers in such a manner as to have bubbles contact essentially the entire surface of each fiber which is continuously awash with bubbles while the fibers are vertical, the air is in contact with the surfaces of the fibers longer than if they were arcuate, and the air is used most effectively to maintain a high flux for a longer period of time than would otherwise be maintained.

It will be evident that if the tank is at ground level, there will be insufficient liquid head to induce a desirable liquid head under gravity alone. Without an adequate siphoning effect, a centrifugal pump may be used to produce the necessary suction. Such a pump should be capable of running dry for a short period, and of maintaining a vacuum on the suction side of from 25.5 cm (10")–51 cm (20") of Hg, or −35 kPa (−5 psi) to −70 kPa (−10 psi). Examples of such pumps rated at 18.9 L/min (5 gpm) @ 15"Hg, are (i) flexible-impeller centrifugal pumps, e.g. Jabsco #30510-2003; (ii) air operated diaphragm pumps, e.g. Wilden M2; (iii) progressing cavity pumps, e.g. Ramoy 3561; and (iv) hosepumps, e.g. Waukesha SP 25.

EXAMPLE 1

Microfiltration of an activated sludge at 30° C. having a concentration of 25 g/L (2.5% TSS) is carried out with a cylindrical skein of polysulfone fibers in a pilot plant tank. The fibers are "air scrubbed" at a flow rate of 12 CFM (0.34 m$^3$/min) with a coarse bubble diffuser generating bubbles in the range from about 5 mm to 25 mm in nominal diameter. The air is sufficient not only for the oxidation requirements of the biomass but also for adequate scrubbing. The fibers have an outside diameter of 1.7 mm, a wall thickness of about 0.5 mm, and a surface porosity in the range from about 20% to 40% with pores about 0.2 μm in diameter, both latter physical properties being determined by a molecular weight cut off at 200,000 Daltons. The skein which has 1440 fibers with a surface area of 12 m$^2$ is wall-mounted in the tank, the vertical spaced apart distance of the headers being about 1% less than the length of a fiber in the skein. The opposed ends of the fibers are potted in upper and lower headers respectively, each about 41 cm long and 10 cm wide. The fixing material of the headers is a polyurethane having a hardness in the range from 50–90 Shore A The average transmembrane pressure differential is about 34.5 kPa (5 psi). Permeate is withdrawn through a conduit connected to a pump generating about 34.5 kPa (5 psi) suction. Permeate is withdrawn at a specific flux of about 0.7 lm$^2$h/kPa yielding about 4.8 l/min of permeate which has an average turbidity of <0.8 NTU, which is a turbidity not discernible to the naked eye.

EXAMPLE 2

Comparison of Operation of a Vertical Skein (ZW 72) in Different Orientations

In the following comparison, three pairs of identical skeins with equally slack fibers are variously positioned (as designated) above aerators in a bioreactor. Each pair is subjected to the same discharge of air through identical aerators. Rectangular but not square headers are chosen to determine whether there is a difference between each of two flat horizontal orientations, which difference would not exist in a horizontal skein with cylindrical headers. A pair of identical rectangular skeins, each having headers 41.66 cm (16.4 in) in length (x-axis), 10.16 cm (4 in) in width (y-axis) and 7.62 cm (3 in) in height (z-axis), in which are potted 1296 Zenon® MF200 microfiltration fibers presenting a nominal fiber surface area of 6.25 m$^2$, were tested in three different orientations in a bioreactor treating domestic wastewaters. The fibers used are the same as those used in Example 1 above. The distance between opposed faces of headers is 90 cm (35.4 in) which is about 2% less than the length of each fiber potted in those headers.

In a first test, the two (first and second) skeins were stacked laterally, each in the same direction along the longitudinal axis, with a 2.5 cm (1 in) thick spacer between the headers, the headers of each skein being in a horizontal flat orientation (area 41.66 cm×7.62 cm) is spaced apart 7.62 cm (3 in) above the floor on which lies the aerators in the form of three side-by-side linear tubes with 3 mm (0.125") openings. The first skein which is directly above the aerators is therefore referred to as the "lower skein".

In a second test, the same first and second skeins are each rotated 90° about the longitudinal x-axis and placed contiguously one beside the other. In this "horizontal 90°" orientation (area defined by 10.16 cm×7.62 cm) is spaced apart from the aerators as in the prior test.

In a third test, the first and second skeins are placed side-by-side in vertical orientations and aeration is provided with a rectangular tube around the periphery of the skein, with perforations in the tube, and there is no internal aerator.

Each test provides the fibers in each orientation with the identical amount of air. Permeate was withdrawn with a pump with a NPSH of 0.3 bar (10" of Hg). The conditions were held constant until it was observed that the flux obtained for each test was substantially constant, this being the equilibrium value. After this occurred, each skein was back pulsed for 30 sec with permeate every 5 minutes to maintain the flux at the equilibrium value.

The test conditions for each of the above three runs were as follows:

TSS in bioreactor 8 g/L; Temperature of biomass 19° C. Flow rate of air 0.2124 m³/min/skein; Suction on fibers 25.4 cm of Hg FIG. 13 is a bar graph which shows the average flux over a 24 hr period for each orientation of the skein as follows:

| Orientation | Average flux L/m²/hr over 24 hr |
| --- | --- |
| Horizontal flat | 21.2 LMH |
| Horizontal 90° | 17.8 LMH |
| Vertical | 27.7 LMH |

This conclusively demonstrates that the vertical orientation of the skein fibers produces the highest overall flux.

EXAMPLE 3
Comparison of Positions of Aerator Inside and Outside the Skein Fibers In this test the difference in flux is measured in a bioreactor treating wastewater contaminated with ethylene glycol, the difference depending upon how a single cylindrical vertical skein (ZW 172) having a nominal surface area of 16 m² is aerated with 3.5 L/min (7.5 scfm). The skein is formed as shown in FIG. 16 around a central PVC pipe having an o.d. of 7.5 cm, the fibers being disposed in an annular zone around the central support, the radial width of the annular zone being about 7.5 cm, so that the o.d. of the skein is about 11.25 cm.

In a first test, air is introduced within the skein; in a second test, air is introduced around the periphery of the skein. After equilibrium is reached, operation is typically continued by back pulsing the skein with permeate at chosen intervals of time, the interval depending upon how quickly the fibers foul sufficiently to decrease the flux substantially.

The process conditions, which were held constant over the period of the test, were as follows:

| TSS | 17 g/L; | Temperature of biomass | 10.5° C. |
| --- | --- | --- | --- |
| Flow rate of air | 0.2124 m³/min; | Suction on fibers | 25.4 cm of Hg |

For external aeration

A perforated flexible tube with holes about 3 mm in diameter spaced about 2.5 cm apart was wrapped around the base of the ZW 72 skein and oriented so that air is discharged in a horizontal plane, so that bubbles enter laterally into the skein, between fibers. Thereafter the bubbles rise vertically through the skein fibers. Lateral discharge helps keep the holes from plugging prematurely.

For internal aeration

The central tubular support was used as the central air distribution manifold to duct air into five 4" lengths of ¼" pipe with ⅛" holes at 1" intervals, plugged at one end, in open flow communication with the central pipe, forming a spoke-like sparger within the skein, at the base. The number of holes is about the same as the number in the external aerator, and the flow rate of air is the same. As before the holes discharge the air laterally within the skein, and the air bubbles rise vertically within the skein, and exit the skein below the upper header.

Figure 14:
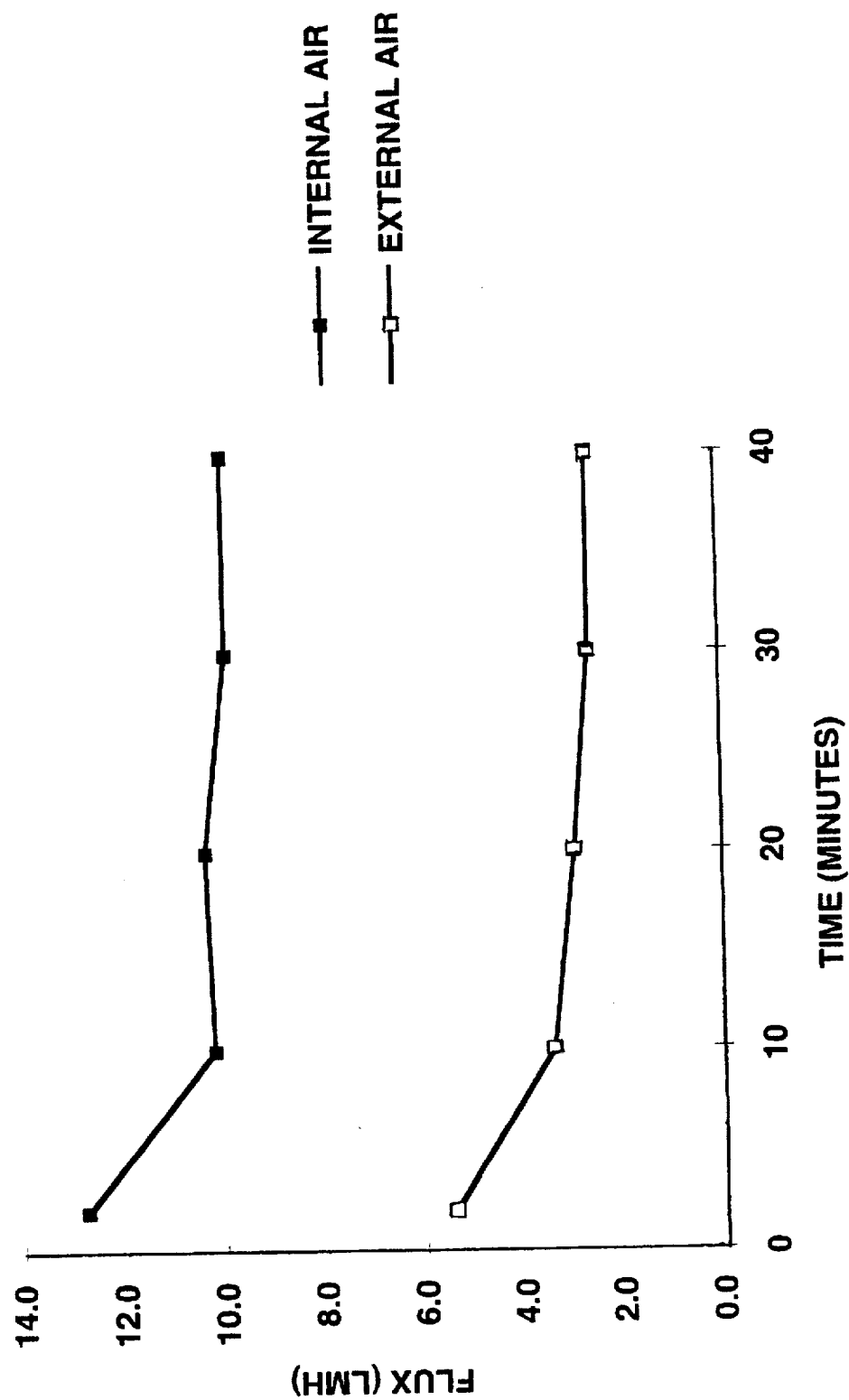
FIG. 14 is a graph in which flux is plotted as a function of time during which a vertical cylindrical skein is aerated at a constant flow rate of air provided in one instance, by external aeration, and in another instance, by internal aeration.

FIG. 14 is a plot of flux as a function of time, until the flux reaches an equilibrium value. Thereafter the flux may be maintained by back pulsing at regular intervals. As is evident, the equilibrium flux with external aeration is about 2.6 LMH, while the flux with internal aeration is about 9.9 LMH which is nearly a four-fold improvement. From the foregoing it will be evident that, since it is well-known that flux is a function of the flow rate of air, all other conditions being the same during normal operation, a higher flux is obtained with internal aeration with the same flow of air.

EXAMPLE 4
Comparison of skeins in which one has swayable fibers, the other does not The slackness in the fibers is adjusted by decreasing the distance between headers. Essentially no slack is present (fibers are taut) when the headers are spaced at a distance which is the same as the length of a fiber between its opposed potted ends. A single ZW 72 skein is used having a nominal surface area of 6.7 m² is used in each test, in a bioreactor to treat wastewater contaminated with ethylene glycol. Aeration is provided as shown in FIG. 9 (no internal aeration) with lateral discharge of air bubbles into the skein fibers through which bubbles rose to the top.

In the first test the headers are vertically spaced apart so that the fibers are taut and could not sway.

In the second test, the headers were brought closer by 2 cm causing a 2.5% slackness in each fiber, permitting the slack fibers to sway.

As before the process conditions, which were held constant over the period of the test, were as follows:

| Suspended solids | 17 g/L | Temperature of biomass | 10.5° C. |
| --- | --- | --- | --- |
| Flow rate of air | 0.2124 m³/min; | Suction on fibers | 25.4 cm of Hg |

Figure 15:
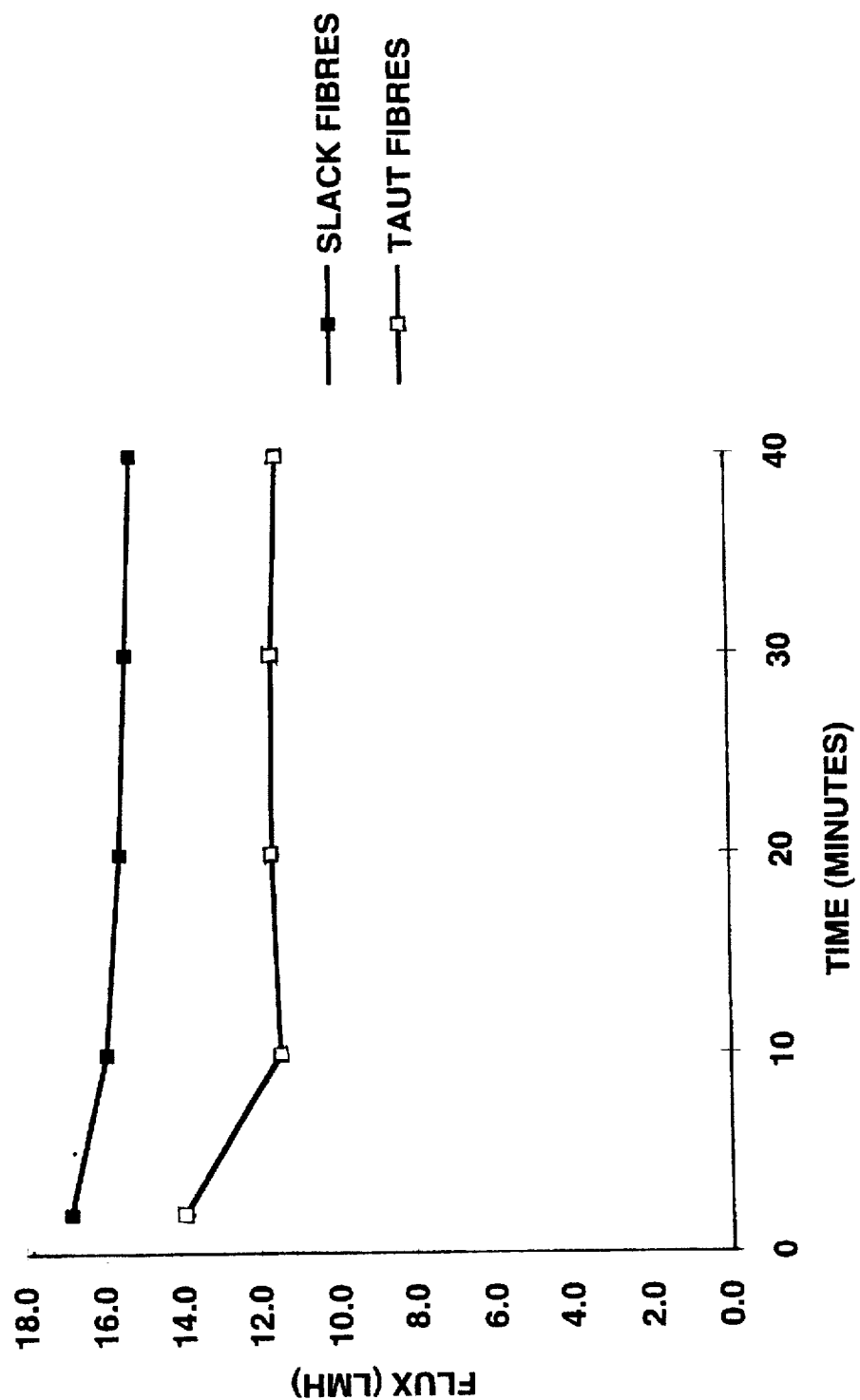
FIG. 15 is a graph in which flux is plotted as a function of time for the same cylindrical skein used in two different embodiments achieved by adjusting the distance between the headers; the first embodiment having spaced apart conventionally at the maximum distance to provide taut fibers, and the other having headers spaced closer together to provide swayable fibers. During the test each vertical cylindrical skein is aerated at a constant flow rate of air.

FIG. 15 is a plot of flux as a function of time, until the flux reaches an equilibrium value. Thereafter the flux may be maintained by back pulsing at regular intervals as before in example 1. As is evident, the equilibrium flux with no swayability is about 11.5 LMH, while the flux with 2.5% slack is about 15.2 LMH, which is about a 30% improvement.

EXAMPLE 5
Filtration of water with a vertical cylindrical skein to obtain clarity A cylindrical skein is constructed as in FIG. 16 with Zenon® MF200 fibers 180 cm long, which provide a surface area of 25 m² in cylindrical headers having a diameter of 28 cm held in end-caps having an o.d. of 30 cm. Aeration is provided with a spider having perforated cross-arms with 3 mm (0.125") dia. openings which discharge about 10 liter/min (20 scfm, standard ft³/min) of air. This skein is used in four typical applications, the results of which are provided below. In each case, permeate is withdrawn with a centrifugal pump having a NPSH of about 0.3 bar (10" Hg), and after equilibrium is reached, the skein is backflushed for 30 sec with permeate every 30 min.

A. Filtration of Surface (Pond) Water having 10 mg/L TSS

Result—permeate having 0.0 mg/L TSS is withdrawn at a rate of 2000 liters/hr (LPH) with a turbidity of 0.1 NTU. A "5 log" reduction (reduction of original concentration by five orders of magnitude) of bacteria, algae, giardia and cryptosporidium may be obtained, thus providing potable water.

B. Filtration of Raw Sewage with 100 mg/L TSS

Result—permeate having 0.0 mg/L suspended solids is withdrawn at a rate of 1000 LPH (liters/hr) with a turbidity of 0.2 NTU. Plural such skeins may be used in a bank in the fully scale treatment of industrial wastewater.

C. Filtration of a mineral suspension containing 1000 mg/L TSS of iron oxide particles Result—permeate having 0.0 mg/L suspended solids is withdrawn at a rate of 3000 LPH (liters/hr) with a turbidity of 0.1 NTU. High flux is maintained with industrial wastewater containing mineral particles.

D. Filtration of fermentation broth with 10,000 mg/L bacterial cells

Result—permeate having 0.0 mg/L suspended solids is withdrawn at a rate of 1000 LPH (liters/hr) with a turbidity of 0.1 NTU. The broth with a high biomass concentration is filtered non-destructively to yield the desired permeate, as well as to save living cells for reuse.

EXAMPLE 6
Special Purpose Mini-Skein

The following examples mustrate the use of a mini-skein for typical specific uses such as filtration of (i) raw sewage to obtain solids-free water samples for colorimetric analyses, (ii) surface water for use in a recreational vehicle ("camper") or motor home, or (ii) water from a small aquarium for fish or other marine animals.

A cylindrical mini-skein is constructed as shown in FIG. 16, with cylindrical headers having an o.d. of 5 cm (2") and a thickness of 2 cm (0.75") with 30 fibers, each 60 cm long to provide a surface area of 0.1 m². The skein is mounted on a base on which is also removably disposed a blower to discharge 15 L/min of air at 12 kPa (3 psig) through a sparger which has 1.6 mm (0.0625") openings, the air flowing through the skein upwards along the fibers. Also removably mounted on the base is a peristaltic pump which produces a vacuum of 0.3 bar (10" Hg). In each application, the self-contained skein with integral permeate pump and gas-discharge means, is placed, for operation, in a cylindrical container of the substrate to be filtered.

The results with each application (A)–(D) are listed below:

(i) Raw sewage contains 100 mg/L TSS; permeate containing 0.0 mg/L TSS having a turbidity of 0.2 NTU, is withdrawn at 0.1 LPH.

(ii) Aquarium water withdrawn contains 20 mg/L TSS, including algae, bacteria, fungus and fecal dendritus; permeate containing 0.0 mg/L TSS having a turbidity of 0.2 NTU, is withdrawn at 0.1 LPH.

(iii) Pond water withdrawn contains 10 mg/L TSS; permeate containing 0.0 mg/L TSS having a turbidity of 0.2 NTU, is withdrawn at 0.1 LPH.

GLOSSARY

The following glossary is provided for terms in the approximate order in which they are used in the specification to define their meaning in the context in which they are used.

"array"—plural, essentially vertical fibers of substantially equal lengths, the one ends of each of which fibers are closely spaced-apart, either linearly in the transverse (y-axis herein) direction to provide at least one row, and typically plural rows of equidistantly spaced apart fibers. Less preferably, a multiplicity of fibers may be spaced in a random pattern. The opposed ends of fibers are sealed in opposed headers so that substrate does not contaminate permeate in permeate collection means in which the headers are peripherally sealed.

"bundle"—plural elements held together, e.g. plural arrays which may be a stack of planar arrays, or arcuate or circular arrays, or a rolled spiral.

"bank"—used for brevity, to refer to a bank of skeins; in the bank, a row (or other configuration) of lower headers is directly beneath a row of upper headers.

"cylindrical skein"—a vertical skein in which the permeate collection means has a cylindrical configuration.

"dead end tank"—a tank or bioreactor from which no liquid other than the permeate is removed.

"fibers"—used for brevity to refer to hollow fiber membranes.

"flux"—unit flow (liters/hr), through a membrane of unit surface area (meter²), flux is given as $Lm^2h$ or LMH.

"fugitive material"—material which is either (i) soluble in a medium in which the fibers and fixing material are not soluble, or (ii) fluidizable by virtue of having a melting point (if the material is crystalline) below that which might damage the fibers or fixing material; or, the material has a glass transition temperature Tg (if the material is non-crystalline), below that which might damage the fibers or material(s) forming the non-fugitive header; or (iii) both soluble and fluidizable.

"header"—a solid body in which one of the terminal end portions of each one of a multiplicity of fibers in the skein, is sealingly secured to preclude substrate from contaminating the permeate in the lumens of the fibers. The body is of arbitrary dimensions formed from a natural or synthetic resinous material (thermoplastic or thermosetting).

"integral header"—combination of header and permeate collection means, in which combination the header is peripherally sealed in fluid-tight relationship with the permeate collection means.

"integral single skein"—a skein in an integral finished header is formed in the permeate pan or end-cap, sealing the header therein.

"mini-skein"—a self-contained gas-scrubbed assembly of a skein having a surface area less than about 5 m², in combination with an integrally packaged gas blower and permeate pump.

"multicomponent liquid feed"—fruit juices to be clarified or concentrated; wastewater or water containing particulate matter; proteinaceous liquid dairy products such as cheese whey, and the like.

"non-vacuum pump"—generates a net suction side pressure difference, or, net positive suction head (NPSH), adequate to provide the transmembrane pressure differential generated under the operating conditions; may be a centrifugal, rotary, crossflow, flow-through, or other type.

"permeability"—flux per unit pressure, $Lm^2h/kPa$; sometimes referred to as specific flux.

"permeate collection means"—receptacle beneath a header in which receptacle permeate collects.

"ring header"—header having a cylindrical shape.

"rectangular skein"—a vertical skein in which the permeate collection means has a configuration of a rectangular parallelpiped.

"skein"—used for brevity to refer to either a cylindrical skein or a vertical skein, or both, having plural arrays potted in opposed headers, the fibers having a critically defined length relative to the vertical distance between headers of the skein. The defined length limits the side-to-side movement of the fibers in the substrate in which they are deployed, except near the headers where there is negligible movement.

"skein fibers"—fibers which make up the cylindrical skein

"vertical skein"—an integrated combination of structural elements including (i) a multiplicity of vertical fibers of substantially equal length; (ii) a pair of headers in each of which are potted the opposed terminal portions of the fibers so as to leave their ends open; and, (iii) permeate collection means held peripherally in fluid-tight engagement with each header so as to collect permeate from the ends of the fibers.

"substrate"—multicomponent liquid feed.

"particulate matter"—micron-sized (from 1 to about 44 μcm) and sub-micron sized (from about 0.1 μm to 1 μm) filtrable matter which includes not only particulate inorganic matter, but also dead and live biologically active microorganisms, colloidal dispersions, solutions of large organic molecules such as fulvic acid and humic acid, and oil emulsions.

"restrictedly swayable"—the extent to which fibers may sway in a zone of confinement, which extent is determined by the free length of the fibers relative to the fixedly spaced-apart headers, and the turbulence of the substrate.

"stack of arrays"—plural rows of arrays, which are densely packed to form, after they are potted, a skein.

"substantially concentrically"—describes a configuration in which in which individual fibers are either vertical and spaced apart along the circumference of a circle drawn about the central vertical axis, or, spirally disposed, successive layers of the fibers typically being closely spaced-apart in the x-y plane, not only radially outwards from the central axis, but also along the spiral in that plane so that they appear to be concentrically distributed at successively increasing radial distances from the central axis.

"transmembrane pressure differential"—pressure difference across a membrane wall, resulting from the process conditions under which the membrane is operating.

"unsupported"—not supported except for spacer means to space the headers.

"vacuum pump"—capable of generating a suction of at least 75 cm of Hg.

"zone of confinement" (or "bubble zone")—a zone through which bubbles rise along the outer surfaces of the fibers. The bubble zone, in turn, is determined by one or more columns of vertically rising gas bubbles generated near the base of a skein.

We claim:

1. In a gas-scrubbed assembly comprising, a microfiltration membrane device in combination with a gas-distribution means to minimize build-up of particulate deposits on the surfaces of hollow fiber membranes ("fibers") in said device, and to recover permeate from a multicomponent liquid substrate while leaving particulate matter therein, said membrane device comprising, a multiplicity of fibers, unconfined in a shell of a module, said fibers being swayable in said substrate, said fibers being subject to a transmembrane pressure differential in the range from about 0.7 kPa (0.1 psi) to about 345 kPa (50 psi);

a first and second header disposed in transversely spaced-apart relationship within said substrate, each header being formed with a potting resin cured in a resin-confining means;

said first header and second header having opposed terminal end portions of each fiber sealingly secured therein, all open ends of said fibers extending from a permeate-discharging face of at least one header;

permeate collection means to collect said permeate through at least one of said headers sealingly connected in open fluid communication with permeate-discharging faces of said headers;

means for withdrawing said permeate; and, said gas-distribution means is located within a zone beneath said skein, said gas-distribution means having through-passages therein adapted to have sufficient gas flowed therethrough to generate enough bubbles flowing in a column of rising bubbles between and around said skein fibers, to keep surfaces of said fibers awash in bubbles;

said fibers, said headers and said permeate collection means together forming a vertical cylindrical skein wherein said fibers are essentially vertically disposed; said first header being upper and disposed in vertically spaced-apart relationship above said second header with opposed faces of said headers at a fixed distance, said fibers being substantially concentrically disposed relative to the vertical axis between said headers;

each of said fibers having substantially the same length, said length being from at least 0.1% greater, to less than 5% greater than said fixed distance so as to permit restricted displacement of an intermediate portion of each fiber, independently of the movement of another fiber;

the improvement comprising, each said header having said fibers spaced apart by a flexible support means having a thickness corresponding to a desired lateral spacing between adjacent fibers, said support means extending over only each terminal portion of said fibers near their ends, so as to maintain said ends in closely-spaced apart relationship, said gas distribution means being disposed between said fibers and having through-passages adapted to discharge said bubbles which rise vertically substantially parallel to, and in contact with said fibers, movement of which is restricted within said column;

whereby said permeate is essentially continuously withdrawn.

2. The gas-scrubbed assembly of claim 1 wherein, said restricted displacement is in the lateral or horizontal direction, said headers are non-removably formed within said resin-confining means, and, said gas-distribution means includes an aerator means disposed adjacent to said lower header's upper face discharging said gas in an amount in the range from 0.47–14 cm$^3$/sec per fiber (0.001 scfm/fiber to about 0.03 scfm/fiber), said aerator means generating bubbles having an average diameter in the range from about 0.1 mm to about 25 mm, said bubbles maintain outer surfaces of said fibers essentially free from build-up of deposits of said particulate matter.

3. The gas-scrubbed assembly of claim 2 wherein, said gas-distribution means includes a vertical member centrally axially disposed within said skein and through at least one said header;

said length is from 1% to less than 5% greater than said fixed distance, said fibers together have a surface area >1 m², each fiber has a length >0.5 meter, said fibers together have a surface area in the range from 10 to $10^3$ m², said headers are vertically adjustable to provide said fixed distance, and, said bubbles are in the size range from 1 mm to 25 mm measured in relatively close proximity, in the range from 1 cm to about 50 cm, to said through-passages.

4. The gas-scrubbed assembly of claim 2 wherein, each header includes both, a fiber-setting form to hold and set said fibers in a chosen pattern, and spacer means to maintain desired fiber-to-fiber spacing within said skein, said both being integral with said header;

said fibers are potted within said synthetic resinous material to a depth in the range from about 1 cm to about 5 cm and protrude through a permeate-discharging face of each said header in a range from about 0.1 mm to about 1 cm.

5. The gas-scrubbed assembly of claim 3 wherein, said permeate collection means includes a vertical member coaxially disposed within said gas distribution means' vertical member, said substrate is maintained at a pressure in the range from about 1–10 atm, said transmembrane pressure differential is in the range from 3.5 kPa (0.5 psi) to about 175 kPa (25 psi), opposed terminal end portions of said fibers are in open communication with each other through each said header;

said fibers are in the range from 0.5 m to 5 m long, and, said terminal end portions of said fibers are potted within said mass of resin to a depth in the range from about 1 cm to about 5 cm.

6. The gas-scrubbed assembly of claim 5 wherein said particulate matter comprises biologically active microorganisms growing in said substrate.

7. The gas-scrubbed assembly of claim 5 wherein said particulate matter comprises finely divided inorganic particles.

8. The gas-scrubbed assembly of claim 1 wherein, each said fiber is formed from a material selected from the group consisting of natural and synthetic polymers, has an outside diameter in the range from about 20 μm to about 3 mm, a wall thickness in the range from about 5 μm to about 2 mm, and, a pore size in the range from 1000 Å to 10000 Å, each said header is a cylindrical disc having substantially the same dimensions, and, said gas is a molecular oxygen-containing gas.

9. In a microfiltration membrane device, for withdrawing permeate essentially continuously from a multicomponent liquid substrate, said membrane device including:

a multiplicity of hollow fiber membranes, or fibers, unconfined in a shell of a module, said fibers being swayable in said substrate, said fibers being subject to a transmembrane pressure differential in the range from about 0.7 kPa (0.1 psi) to about 345 kPa (50 psi);

a first header and a second header disposed in transversely spaced-apart relationship with said second header within said substrate;

said first header having a terminal end portion of each fiber secured therein, and said second header having an opposed terminal end portion of each fiber secured therein, all said fibers extending from a permeate-discharging face of at least one said header;

said fibers being sealingly secured with open ends of the fibers secured in fluid-tight relationship with each other in at least one of said headers;

permeate collection means to collect said permeate through at least one of said headers sealingly connected in open fluid communication with permeate-discharging faces of said headers;

and, means for withdrawing said permeate;

said fibers, said headers and said permeate collection means together forming a vertical cylindrical skein wherein said fibers are essentially vertically disposed; said first header being upper and disposed in vertically spaced-apart relationship above said second header, with opposed faces at a fixed distance;

each of said fibers having substantially the same length, said length being from 0.1% to less than 5% greater than said fixed distance so as to permit restricted displacement of an intermediate portion of each fiber, independently of the movement of another fiber;

the improvement comprising, each said header having said fibers spaced apart by a flexible support means having a thickness corresponding to a desired lateral spacing between adjacent fibers, said support means extending over only each terminal portion of said fibers near their ends so as to maintain said ends in closely-spaced apart relationship.

10. The membrane device of claim 9 wherein, each said header is a mass of synthetic resinous material in which said terminal end portions are potted and said fibers are formed from natural or synthetic polymers;

each said fiber has an outside diameter in the range from about 20 μm to about 3 mm, a wall thickness in the range from about 5 μm to about 2 mm, pore size in the range from 1,000 Å to 10,000 Å; and, said displacement is in the lateral or horizontal direction.

11. The membrane device of claim 10 wherein, said permeate collection means includes a vertical member axially disposed through said headers and within said skein, said substrate is maintained at a pressure in the range from about 1–10 atm, said fibers extend as a skein upwardly from a fiber-supporting face of each of said headers, each header has substantially the same dimensions, said fibers extend downwardly through the permeate-discharging face of said headers, and said permeate is discharged upwardly relative to said upper header.

12. The membrane device of claim 11 wherein, said fibers together have a surface area >1 m², each fiber has a length >0.5 meter, said fibers together have a surface area in the range from 10 to 103 m² and, said terminal end portions of said fibers protrude through a permeate-discharging face of each said header in a range from about 0.1 mm to about 1 cm.

13. In a process for maintaining the outer surfaces of hollow fiber membranes essentially free from a build-up of deposits of particulate material while separating a permeate from a multicomponent liquid substrate in a reservoir, said process comprising, submerging skein fibers in an essentially vertical, cylindrical configuration within said substrate, said fibers being unconfined in a modular shell, and securely held in vertically opposed, upper and lower headers spaced-apart at a fixed distance, said fibers having substantially the same length and from at least 0.1% greater, to about 5% greater than said fixed distance, a transmembrane pressure differential in the range from about 0.7 kPa (0.1 psi) to about 345 kPa (50 psi), and length sufficiently greater than the direct distance between opposed faces of said first and second headers, so as to present said skein in a swayable configuration above a horizontal plane through the horizontal center-line of said lower header;

mounting said headers in fluid-tight open communication with collection means to collect said permeate;

flowing a fiber-cleaning gas through a gas-distribution means proximately disposed relative to said skein, within a zone beneath said skein, and contacting surfaces of said fibers with sufficient physical impact of bubbles of said gas to maintain essentially the entire length of each fibers in said skein awash with bubbles and essentially free from said build-up;

maintaining an essentially constant flux through said fibers substantially the same as an equilibrium flux initially obtained after commencing operation of said process;

collecting said permeate in said collection means; and, withdrawing said permeate, the improvement comprising, introducing said cleansing gas between said fibers within said skein to generate a column of said bubbles alongside and in contact with outer surfaces of said fibers; said fibers spaced apart by a flexible support means having a thickness corresponding to a desired lateral spacing between adjacent fibers, said support means extending over only each terminal portion of said fibers near their ends, so as to maintain said ends in closely apart relationship;

restricting movement of said fibers to said vertical zone defined by lateral movement of outer fibers in said skein;

vertically gas-scrubbing said fibers outside surfaces with bubbles which flow upward in contact with said surfaces;

maintaining said surfaces substantially free from said deposits of particulate matter during a period when flux through said fibers has attained equilibrium; and simultaneously, essentially continuously, withdrawing said permeate.

14. The process of claim 13 wherein, each said hollow fiber has an outside diameter in the range from about 20 μm to about 3 mm, and a wall thickness in the range from about 5 μm to about 1 mm;

said particulate matter is selected from the group consisting of microorganisms and finely divided inorganic particles; and, said gas-distribution means discharges gas in an amount in the range from 0.47–14 cm$^3$/sec per fiber (0.001 scfm/fiber to about 0.03 scfm/fiber) and generates bubbles having an average diameter in the range from about 1 mm to about 25 mm.

* * * * *

UNITED STATES PATENT AND TRADEMARK OFFICE
CERTIFICATE OF CORRECTION

PATENT NO. : 5,783,083
DATED : July 21, 1998
INVENTOR(S) : Wayne Jerald Henshaw et al.

It is certified that error appears in the above-identified patent and that said Letters Patent is hereby corrected as shown below:

Claim 13, col. 28, line 6, delete "apart" and substitute -- spaced-apart --.

Signed and Sealed this

Sixth Day of April, 1999

Attest:

Q. TODD DICKINSON

Attesting Officer

Acting Commissioner of Patents and Trademarks